(12) United States Patent
McCoy et al.

(10) Patent No.: US 9,756,282 B2
(45) Date of Patent: Sep. 5, 2017

(54) METHOD AND APPARATUS FOR PROCESSING A VIDEO SIGNAL FOR DISPLAY

(71) Applicant: Sony Corporation, Tokyo (JP)

(72) Inventors: Charles McCoy, Coronado, CA (US); Ling Jun Wong, Champaign, IL (US); True Xiong, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 356 days.

(21) Appl. No.: 13/682,493

(22) Filed: Nov. 20, 2012

(65) Prior Publication Data
US 2014/0139736 A1    May 22, 2014

(51) Int. Cl.
*G06T 3/40* (2006.01)
*H04N 7/01* (2006.01)
*G09G 3/00* (2006.01)

(52) U.S. Cl.
CPC ............. *H04N 7/0122* (2013.01); *G06T 3/40* (2013.01)

(58) Field of Classification Search
CPC .............. G06T 3/40; G09G 2340/0442; G09G 2340/125; G09G 3/003; G09G 3/3426
USPC ........ 345/660, 173, 619, 589, 592; 715/781; 348/445, 556; 709/203; 725/153; 386/245, 248
See application file for complete search history.

(56) References Cited

U.S. PATENT DOCUMENTS

| 5,249,049 | A | 9/1993 | Kranawetter et al. |
|---|---|---|---|
| 6,208,385 | B1 | 3/2001 | Konishi et al. |
| 6,785,463 | B2 * | 8/2004 | Yamauchi et al. ............ 725/153 |
| 6,947,097 | B1 | 9/2005 | Joanblanq |
| 7,224,401 | B2 | 5/2007 | Ackley et al. |
| 7,450,826 | B2 | 11/2008 | Lasorsa et al. |
| 7,511,742 | B2 * | 3/2009 | Ito ...................... H04N 5/23293 348/556 |

(Continued)

FOREIGN PATENT DOCUMENTS

| CN | 1206533 A | 1/1999 |
|---|---|---|
| CN | 101042624 A | 9/2007 |

(Continued)

OTHER PUBLICATIONS

Japanese Office Action dated on Nov. 11, 2015 in patent application No. 2013-229292.

(Continued)

*Primary Examiner* — Chante Harrison
(74) *Attorney, Agent, or Firm* — Chip Law Group

(57) ABSTRACT

A method and apparatus for processing a video signal is provided. The method and apparatus comprises a consolidator configured to consolidate a plurality of unutilized regions based on a determination of a difference between an aspect ratio of a display being generated and an aspect ratio of first content to form a consolidated display region. The method and apparatus consolidates the plurality of unutilized regions to generate an output video signal having the consolidated region and a first content region associated with the first content. The plurality of unutilized regions is consolidated by at least partially moving the first content region towards at least one edge of the output video signal. The plurality of unutilized regions is consolidated by scaling down size of the first content region associated with the first content.

19 Claims, 12 Drawing Sheets

(56) References Cited

U.S. PATENT DOCUMENTS

| | | | |
|---|---|---|---|
| 7,538,821 B2 | 5/2009 | Ahn et al. | |
| 8,817,188 B2* | 8/2014 | Yang | G11B 27/034 348/556 |
| 2002/0009295 A1* | 1/2002 | Itani | 348/445 |
| 2002/0027614 A1* | 3/2002 | Konuma | H04N 7/0122 348/558 |
| 2005/0017988 A1* | 1/2005 | Ackley et al. | 345/660 |
| 2006/0002687 A1* | 1/2006 | Thrall | H04N 9/8042 348/556 |
| 2007/0222769 A1* | 9/2007 | Otsuka | G01C 21/3664 345/173 |
| 2007/0229664 A1* | 10/2007 | Nagaoka | H04N 5/20 348/556 |
| 2009/0027552 A1 | 1/2009 | Yang et al. | |
| 2011/0150421 A1* | 6/2011 | Sasaki | G11B 27/3027 386/241 |
| 2011/0320529 A1* | 12/2011 | Mentchoukov et al. | 709/203 |
| 2012/0075417 A1* | 3/2012 | Chang | 348/43 |
| 2012/0113211 A1* | 5/2012 | Yi | H04N 7/14 348/14.07 |
| 2013/0077060 A1* | 3/2013 | Sakai | H04N 9/3185 353/69 |
| 2013/0271447 A1* | 10/2013 | Setlur et al. | 345/173 |
| 2013/0271661 A1* | 10/2013 | Kimura | H04N 5/44591 348/564 |
| 2014/0055367 A1* | 2/2014 | Dearman et al. | 345/173 |
| 2014/0059478 A1* | 2/2014 | Dearman et al. | 715/781 |
| 2014/0071169 A1* | 3/2014 | Chang | 345/660 |

FOREIGN PATENT DOCUMENTS

| | | |
|---|---|---|
| CN | 101354882 A | 1/2009 |
| EP | 0863669 A1 | 9/1998 |
| EP | 1837748 A1 | 9/2007 |
| EP | 2461260 A1 | 6/2012 |
| JP | H07-107410 A | 11/1995 |
| JP | 2001045444 A | 2/2001 |
| JP | 2003-174601 A | 6/2003 |
| JP | 2007-135158 A | 5/2007 |
| JP | 2007282082 A | 10/2007 |
| JP | 2010-107909 A | 5/2010 |
| JP | 2011205709 A | 10/2011 |
| JP | 2012-120157 A | 6/2012 |
| KR | 10-1999-0042918 A | 6/1999 |

OTHER PUBLICATIONS

Office Action for CN Patent Application No. 201310589024.0, dated Sep. 2, 2016, 9 pages of Office Action and 14 pages of English Translation.

Office Action for CN Patent Application No. 201310589024.0, dated Mar. 2, 2017, 10 pages of Office Action and 9 pages of English Translation.

* cited by examiner

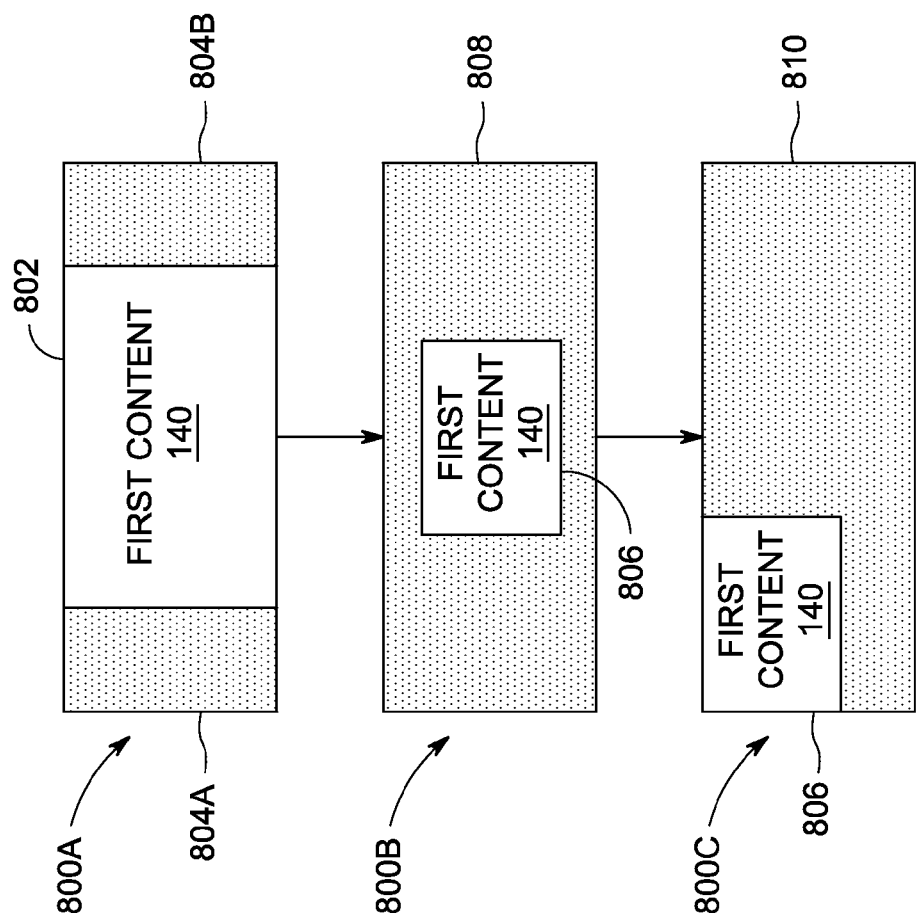

METHOD AND APPARATUS FOR PROCESSING A VIDEO SIGNAL FOR DISPLAY

FIELD

The disclosure generally relates to video signal processing and, more specifically, the disclosure relates to a method and apparatus for processing a video signal for display.

BACKGROUND

Advancements in video processing technologies enable production of video and/or image content having different aspect ratios, such as 4:3, 16:9. Further, current display technologies provide for display screens having different aspect ratios. For example, the aspect ratio of a display screen of a standard-definition television is 4:3 and the aspect ratio of a display screen of a typical high-definition television is 16:9.

When an aspect ratio of content, such as, an image or a video, differs from an aspect ratio of a display screen that displays the content, a plurality of letterbox or pillarbox regions become visible on the display screen. Typically, these regions are located on two opposite sides on the content display area of the screen. For example, the letterbox regions can appear towards the top and bottom of the content being displayed. The pillarbox regions can appear towards the left and right side of the content being displayed. Generally, the letterbox and pillarbox regions do not display any content (i.e., are unused) and appear as a solid color (typically, black) to the viewer. In certain scenarios, the letterbox and pillarbox regions, which are distributed on both sides of the content display area, may be utilized to display filler content. However, the utilization of the distributed letterbox and pillarbox regions is limited.

Thus, there is a need for processing a video signal to manage the letterbox/pillarbox regions for improved utilization of display screen.

SUMMARY

An apparatus and/or method for processing a video signal for display, substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

BRIEF DESCRIPTION OF DRAWINGS

The following detailed description of the various embodiments will be better understood when read with reference to the appended drawings. The embodiments are illustrated by way of examples, and are not limited by the accompanying figures, in which like references indicate similar elements.

FIG. 8 illustrates an example of consolidating plurality of unutilized regions by scaling down size of first content region in accordance with an embodiment.

DETAILED DESCRIPTION

Figure 1:
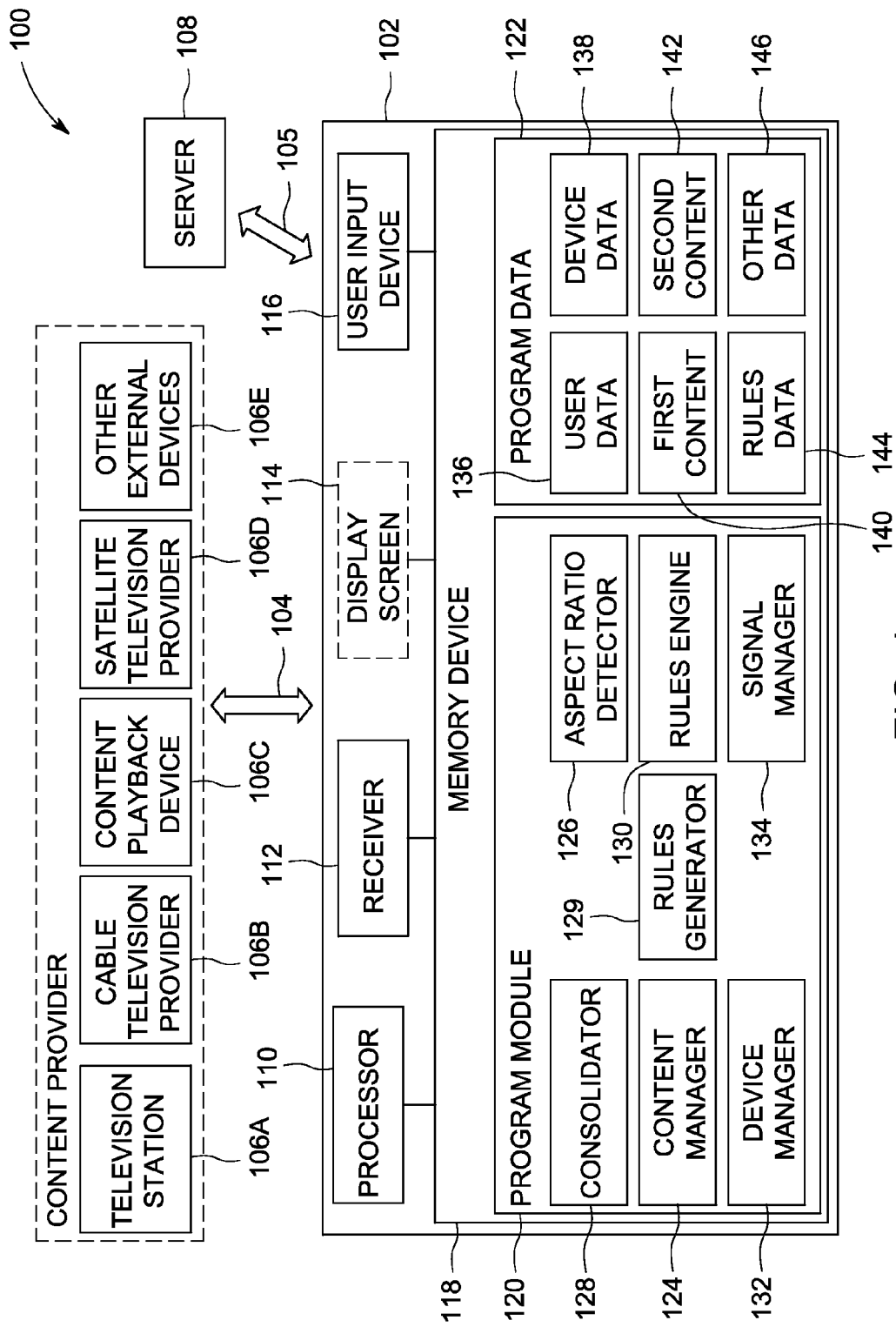
FIG. 1 illustrates a block diagram of a system environment in which embodiments of the present invention can be implemented.

The disclosed embodiments can be best understood with reference to the figures and detailed description set forth herein. Various embodiments are described below with reference to the figures. However, those skilled in the art will readily appreciate that the detailed description given herein with respect to these figures is just for explanatory purposes, as the disclosed methods and apparatus extend beyond the described embodiments.

Definition of Terms

Aspect Ratio: An aspect ratio describes the proportional relationship between width and height of a surface. An aspect ratio of an image frame refers to the ratio of the width of the image frame to the height of the image frame. For a display screen, the aspect ratio is specifically the ratio of the width of the display screen compared to its height. For example, the aspect ratio of a display screen of a standard-definition television is 4:3 and the aspect ratio of a display screen of a high-definition television is 16:9.

Signal-processing device: A signal-processing device corresponds to an electronic device capable of processing a received input video signal and generating an output video signal. In an embodiment, the signal-processing device may include a display screen or a projection surface integrated with the signal-processing device. The display screen or the projection surface displays the output video signal. Examples of such signal-processing device include, but are not limited to, laptops, televisions (TV), tablet computers, desktop computers, mobile phones, gaming devices, and other such devices that have display capabilities. In another embodiment, the signal-processing device may connect to a display screen or a projection surface external to the signal-processing device. The external display screen or the projection surface receives the output video signal from the signal-processing device and displays the output video signal. Examples of such signal-processing device may include, but are not limited to, a cable box, satellite receiver, network video box, a Blu-ray player, and a DVD player.

Display being generated: Display being generated corresponds to a signal generated by a signal-processing device that includes a first content. The display being generated includes a first content region associated with the first content. The display being generated may also include plurality of unutilized regions along with the first content. The plurality of unutilized regions corresponds to regions of the display being generated other than the first content region associated with the first content. The plurality of unutilized regions may occur when an aspect ratio of the first content is different from an aspect ratio of the display being generated by the signal-processing apparatus. The plurality of unutilized regions may also occur if size of the first content region is smaller than size of the display being generated by the signal-processing apparatus. Examples of display formats in which a plurality of unutilized regions are present may include, but are not limited to, a letterbox format, a pillarbox format, and a windowbox format. Generally, the plurality of unutilized regions occurs on opposite sides of the first content region associated with the first content. The plurality of unutilized regions on the opposite sides of the first content region is equal in size. In a letterbox display format, the unutilized regions appear above and below the first content region. Similarly, in a pillarbox display format, unutilized regions appear on left and right side of the first content region. In a windowbox display format, unutilized regions appear on all four sides (left side, right side, above, and below) of the first content region. The signal-processing device stores the display being generated in a memory associated with the signal-processing device. The signal-processing device may render the display being generated for display on a display screen associated with the signal-processing device. The display being generated may be stored in frame buffer of the signal-processing device before being rendered for display. In an embodiment, prior to rendering or storing the display being generated, the signal-processing device may modify the display being generated according to various embodiments of the present disclosure to form an output video signal.

Output video signal: Output video signal corresponds to an output signal generated by a signal-processing device. The output video signal includes a first content region associated with first content and a consolidated region associated with second content. In an embodiment, the signal-processing device may store the output video signal in memory associated with the signal-processing device. In another embodiment, the signal-processing device may transmit the output video signal to another device for storing. In another embodiment, the signal-processing device may render the output video signal for display on a display screen and/or a projection screen integrated with and/or external to the signal-processing device.

First content: First content refers to a live or a recorded image and/or a video. Examples of the first content include, but are not limited to, a movie, a television program, live coverage of a sports event, an award ceremony, a video-on-demand, a video or a graphic game, etc. A content provider or a content playback device, such as a Digital Versatile Disk (DVD) player, may provide the input video signal to the signal-processing device. The signal-processing device derives the first content from the received input video signal. In an embodiment, content of the input video signal includes at least one of filler content or black bars. The signal-processing device removes the at least one of the filler content or the black bars from the content of the input video signal to derive the first content. In another embodiment, when the content of the input video signal is free from the filler content and the black bars, the first content is same as the content of the input video signal. In an embodiment, the signal-processing device associates the first content with the first content region of the output video signal.

First content region: First content region corresponds to a region of an output video signal that is associated with the first content. In an embodiment, the size of the first content region is less than the size of the output video signal when an aspect ratio of the first content associated with the first content region differs from an aspect ratio of the output video signal. In another embodiment, the size of the first content region is equal to the size of the output video signal when the aspect ratio of the first content is equal to the aspect ratio of the output video signal. In yet another embodiment, the size of the first display region is less than the size of the output video signal even when the aspect ratio of the first content is equal to the aspect ratio of the output video signal. This can occur typically when the signal-processing device scales down the size of the first content region and the aspect ratio of the first content region is same as the aspect ratio of the first content.

Consolidated region: Consolidated region corresponds to a region of an output video signal that is obtained by combining a plurality of unutilized regions. For example, combining unutilized regions above and below the first content region forms a consolidated region. Similarly, the combination of unutilized regions on the right and left sides of the first content region forms a consolidated region. In another example, a combination of unutilized regions on all sides (above, below, right side, and left side) of the first content region forms a consolidated region. In an embodiment, a user can customize the color of the consolidated region. In another embodiment, the signal-processing device can change size of the consolidated region by scaling the size of the first content region. For example, the signal-processing device can enlarge the size of the consolidated region by scaling down the size of the first content region. Similarly, the signal-processing device can reduce the size of the consolidated region by scaling up the size of the first content region.

Second content: Second content corresponds to information included in an output video signal in addition to the first content. In an embodiment, the second content is associated with a consolidated region of the output video signal. Any information source including, but not limited to, sources of graphics, text, multimedia, video, and the like may supply the second content. Examples of the second content may include, but are not limited to, a closed caption, metadata associated with the first content, an advertisement, decorative animation, and a direction to press buttons of a remote control associated with the signal-processing device. Other examples of the second content may include home surveillance camera video, information obtained from a website, emails, social network activity, a stock ticker, and a widget that provides information such as weather or traffic alerts. The second content may also include one or more thumbnail videos having content similar to the first content. For example, the second content may include thumbnail videos of several other games when the first content is a game. In an embodiment, the second may be combination of two or more types of information.

Rule: A rule corresponds to one or more conditions or events that determine a manner of utilization of a consolidated region. One or more rules determine how and what type of second content is associated with the consolidated region. For example, the one or more rules determine size and location of the consolidated region associated with second content. The one or more rules may further determine importance of the second content in comparison to a first content. The one or more rules may determine whether to scale down size of a first content region if no consolidated region is associated with a second content. Examples of such rules include, but are not limited to, associate an advertisement of a signal-processing device manufacturer with the consolidated region, associate additional information about first content with the consolidated region, and associate an advertisement related to the first content with the consolidated display region. Other examples of such rules may include, but are not limited to, scale down size of the first content region if the second content is more important than the first content and scale up the size of the first content region if second content requires a smaller consolidated region. In an embodiment, the one or more rules can remain fixed for a pre-defined duration and updated periodically. In another embodiment, the one or more rules are defined in real-time and can change dynamically based on a variety of factors, such as a first set of parameters associated with a user associated with the signal-processing device or a second set of parameters associated with a content provider associated with the first content. The one or more rules can change dynamically based on other factors such as metadata associated with the first content or the second content.

First set of parameters: First set of parameters includes one or more characteristics of a user associated with a signal-processing device. The first set of parameters includes at least one of a user profile, a user preference, a user customized setting of the signal-processing device, geographic location, a demographic profile, or user activities, such as clicking within one or more web pages, purchasing products and/or services, on a website of a signal-processing device manufacturer.

Second set of parameters: Second set of parameters includes one or more attributes of a content provider. Examples of such attributes may include, but are not limited to, type and quality of the first content.

Metadata associated with first content: Metadata associated with first content corresponds to information about the first content. In an embodiment, the metadata associated with the first content may be a real-time metadata. Examples of such metadata may include, but are not limited to, name of the first content, type of the first content, playback time of the first content, a content ID, or supplemental information associated with the first content. The content ID can point to an entry in a catalog maintained by a content provider providing the first content. The content ID identifies the first content in a database storing content, such as Internet Movie Database (IMDB). For example, if the first content is a video, the metadata associated with the video may include, but is not limited to, title of the video, characters of the video, relation between various characters of the video, information about locations in the video, and information about other similar videos. In a specific example, when the first content is a sports event, the metadata associated with the sports event may include profiles of players, information about location of the sports event, team statistics, real-time score, remaining time of the sport event, etc.

The present disclosure relates to a method and an apparatus for processing a video signal. In an embodiment, the signal-processing device determines a difference between an aspect ratio of a display being generated and an aspect ratio of first content. When the difference between the two aspect ratios exists, the signal-processing device determines that a plurality of unutilized regions will appear in the display being generated. In another embodiment, the signal-processing device determines a difference between size of the first content region and the display being generated (e.g., pillarbox, windowbox, letterbox and the like). When the difference between the two sizes exists, the signal-processing device determines that a plurality of unutilized display regions will appear in the display being generated (e.g., pillarbox, windowbox, letterbox and the like). If the signal-processing device determines that the plurality of unutilized display regions will appear, the signal-processing device consolidates the plurality of unutilized regions to form a consolidated region. The signal-processing device generates an output video signal having the consolidated region and a first content region associated with the first content. In an embodiment, the signal-processing device consolidates the plurality of unutilized regions by, at least partially, moving the first content region towards at least one edge of the output video signal. In another embodiment, the signal-processing device consolidates the plurality of unutilized regions by scaling down size of the first content region. Further, the signal-processing device may associate second content with the consolidated region based on one or more rules associated with utilization of the consolidated region.

FIG. 1 illustrates a block diagram of a system environment 100 in which the present disclosure can be implemented in accordance with an embodiment. The system environment 100 includes a signal-processing device 102, a first communication medium 104, a second communication medium 105, a television station 106a, a cable television provider 106b, a content playback device 106c, a satellite TV provider 106d, and other external devices 106e (hereinafter referred to as a content provider 106), and a server 108. Although FIG. 1 shows only one signal-processing device (such as the signal-processing device 102) for simplicity, one may appreciate that the implementation of disclosed embodiments can occur for a large number of signal-processing devices.

The first communication medium 104 corresponds to a medium through which the content provider 106 communicates with the signal-processing device 102. The first communication medium 104 may be a wired or a wireless communication medium. Examples of the first communication medium 104 may include, but are not limited to, a television broadcasting system, a Community Access Television (CATV or Cable TV) network, a satellite broadcast system, an over-the-air (OTA) broadcast network, and HDMI cable network.

The second communication medium 105 corresponds to a medium through which the server 108 communicates with the signal-processing device 102. Examples of the second communication medium 105 may include, but are not limited to, an IPTV network, the Internet, a Wireless Fidelity (Wi-Fi) network, a Wireless Area Network (WAN), a Local Area Network (LAN), a telephone line (POTS), or a Metropolitan Area Network (MAN). The server 108 can connect to the second communication medium 105 through wired connection such as through HDMI cable, or through wireless connection. Further, the server 108 can communicate with the second communication medium 105 in accordance with various wired and wireless communication protocols such as Transmission Control Protocol and Internet Protocol (TCP/IP), User Datagram Protocol (UDP), 2G, 3G, or 4 G communication protocols.

The content provider 106 corresponds to any device or system that provides an input video signal containing at least one of first content or second content to the signal-processing device 102. Examples of the content provider 106 may include, but are not limited to, television stations such as the television station 106a, cable television providers such as the cable television provider 106b, the content playback device 106c, an on-demand content provider, and a website that provides different types of information. Examples of the television station 106a may include local network television stations, and terrestrial and satellite TV providers, such as the satellite TV provider 106d. Examples of the content playback device 106c may include a Digital Versatile Disk (DVD) player or a Blu-ray player. Other examples of the content provider 106 may include the other external devices 106e such as a cable box, a camera, a camcorder, and a game console. In an embodiment, the content provider 106 and the signal-processing device 102 may be same. For example, a Digital Versatile Disk (DVD) player may be a source of an input video signal. The DVD player may process the input video signal and generate an output video signal. The content provider 106 may include a storage device, and/or multiple storage devices distributively connected, that maintain a repository of content provided by one or more content providers. In an embodiment, the content provider 106 communicates with the signal-processing device 102 through the first communication medium 104. In another embodiment, the content provider 106 communicates with the signal-processing device 102 through the second communication medium 105. In an embodiment, the content provider 106 may transmit the input video signal containing at least one of the first content or the second content to the signal-processing device 102 in accordance with various digital transmission protocols such as, but not limited to, Digital Terrestrial Television (DTTV) and Internet Protocol Television (IPTV). In an embodiment, the content provider 106 may provide the first content having an aspect ratio that differs from the aspect ratio of the display being generated by the signal-processing device 102. In another embodiment, the content provider 106 may provide the first content having a size lesser than the size of the display being generated. In an embodiment, the content provider 106 may define one or more rules associated with the utilization of the consolidated region and may provide the one or more rules to the signal-processing device 102.

The server 108 corresponds to a computing device or a server-computing device that can provide the first content and/or the second content to the signal-processing device 102. In an embodiment, the server 108 hosts a website of a manufacturer of the signal-processing device 102. The server 108 further provides information about the signal-processing device 102, and other products and services offered by the manufacturer of the signal-processing device 102. The server 108 further provides an option to a user for customizing settings of the signal-processing device 102. Through the server 108, the user can further customize the location of the consolidated region in the output video signal, color of the consolidated region, and the type of the second content associated with the consolidated region.

In an embodiment, the server 108 defines one or more rules associated with the second content associated with the consolidated region of the output video signal. In an embodiment, the server 108 further provides the second content to the signal-processing device 102. Implementation of the server 108 may occur as a cluster or network of computing devices that jointly perform the functions of the server 108. The server 108 may optionally include storage media for storing data associated with the signal-processing device 102, the content provider 106, etc.

The signal-processing device 102 processes the input video signal received from the content provider 106 and generates an output video signal. The signal-processing device 102 may store the output video signal and/or render the output video signal for display. The signal-processing device 102 includes a processor 110, a receiver 112, a display screen 114, a user input device 116, and a memory device 118. Further, the memory device 118 includes program module 120 and program data 122. The display screen 114 may be optional, as represented by dashed box in the block diagram of FIG. 1.

The processor 110 couples to the receiver 112, the display screen 114, the user input device 116, and the memory device 118. The processor 110 executes a set of instructions stored in the memory device 118.

The receiver 112 receives data and messages. The receiver 112 receives data in accordance with various known communication protocols. In an embodiment, the receiver 112 receives the input video signal containing the first content and/or the second content from the content provider 106. In another embodiment, the receiver 112 receives the second content and/or the one or more rules from the server 108. In an embodiment, the receiver 112 can directly receive at least one of the input video signal, the second content, or the one or more rules from the content provider 106 and/or the server 108 over a wired or a wireless connection through the first communication medium 104. In another embodiment, the receiver 112 can receive the input video signal and the second content from a digital storage medium such as DVD, CD, and USB flash drive. In an embodiment, the receiver 112 may be a television tuner that receives television broadcast from the television station 106a and/or the cable television provider 106b. In an embodiment, the receiver 112 decodes the input video signal. For example, the receiver 112 decodes one or more video signals received from one or more home surveillance cameras. In another example, the receiver 112 decodes one or more video signals received from a DVD and/or a CD player. In some embodiments, the receiver 112 may be a transceiver that can transmit messages and data, for example, to the content provider 106 and/or the server 108.

The display screen 114 displays the output video signal. In an embodiment, the signal-processing device 102 may render the output video signal for display on the display screen 114. In such a case, the display screen 114 displays the first content within a first display region on the display screen 114. Further, the display screen 114 optionally displays the second content within a consolidated display region on the display screen 114 based on one or more rules. Realization of the display screen 114 can occur through several known technologies such as, but not limited to, Cathode Ray Tube (CRT) based display, Liquid Crystal Display (LCD), Light Emitting Diode (LED) based display, and Organic LED (OLED) display technology. Further, the display screen 114 can be a touch screen that receives input from a user associated with the signal-processing device 102. Although FIG. 1 shows the display screen 114 as a part of the signal-processing device 102, those skilled in the art may appreciate that the display screen 114 may be external to the signal-processing device 102 and connects to the signal-processing device 102 through a wired or a wireless connection.

The user input device 116 receives a user input for controlling operations of the signal-processing device 102. Examples of the user input device 116 may include, but are not limited to, a keyboard, a mouse, a joystick, a gamepad, a stylus, a remote control, or a touch screen.

The memory device 118 stores a set of instructions or modules, and data. Some of the commonly known memory device implementations can be, but are not limited to, Random Access Memory (RAM), Read Only Memory (ROM), Hard Disk Drive (HDD), and a Secure Digital (SD) card. The program module 120 includes a set of instructions that the processor 110 can execute to perform specific functions in the signal-processing device 102. Further, the program module 120 includes a content manager 124, an aspect ratio detector 126, a consolidator 128, a rules generator 129, a rules engine 130, a device manager 132, and a signal manager 134.

The program data 122 in the memory device 118 include user data 136, device data 138, content data such as first content 140 and second content 142, rules data 144, and other data 146.

The content manager 124 receives the input video signal containing the first content. The content manager 124 receives the input video signal from the content provider 106. In an embodiment, when content of the received input video signal includes filler content and/or black bars, the content manager 124 extracts the first content 140 from the input video signal. The content manager 124 analyzes frames of the input video signal to detect the black bars and/or the filler content, and determines a portion of each frame that contains the first content 140. The content manager 124 analyzes the frames to identify horizontal and/or vertical discontinuities that stay in same location as the content of the input video signal changes and detects the filler content and/or the black bars based on the discontinuities. In an embodiment, the content manager 124 detects the filler content and/or the black bars using various display detection algorithms that can detect discontinuities in one or more properties, such as color and intensity, of the pixels of the received input video signal. In another embodiment, the content manager 124 detects the filler content and/or the black bars by detecting pixels of the received input video signal for which the one or more properties, such as color and intensity, remains unchanged. In another embodiment, the content manager 124 detects the filler content and/or the black bars by detecting those pixels of the received input video signal for which the one or more properties do not change in synchronization with the first content. In yet another embodiment, the content manager 124 detects the filler content and/or the black bars by detecting discontinuities at the boundaries of the first content region associated with the first content. In another embodiment, the content manager 124 detects branded images displayed by cable networks as the filler content. A person skilled in the art would appreciate that the content manager 124 can detects the filler content and/or the black bars by using a known method.

If the content manager 124 detects the filler content and/or the black bars, the content manager 124 extracts the first content from the content of the input video signal by omitting the filler content and/or the black bars. In another embodiment, when the content of the input video signal is free from the filler content and the black bars, the content manager 124 considers the content of the input video signal as the first content. The content manager 124 stores the derived first content as first content 140. The content manager 124 further determines whether the second content 142 associated with the consolidated region is available. When the second content 142 is available, the content manager 124 receives another input signal containing the second content associated with a consolidated region and stores the received second content as the second content 142.

The aspect ratio detector 126 detects an aspect ratio of the first content 140. The aspect ratio detector 126 further detects a size of a first content region associated with the first content 140. The aspect ratio detector 126 analyzes the first content 140 to detect the aspect ratio and the size of the first content region associated with the first content 140. When the input video signal includes the filler content and/or the black bars, the aspect ratio of the first content may differ from an aspect ratio of the input video signal. For example, when the aspect ratio of the input video signal is 16:9, the aspect ratio of the first content 140 contained in the input video signal may be 4:3. In such a case, the input video signal includes filler content and/or black bars added to the first content 140 to create the input video signal of aspect ratio 16:9. When the content of the input video signal is free from the filler content and the black bars, the aspect ratio of the first content 140 is same as an aspect ratio of the input video signal.

In an embodiment, the aspect ratio detector 126 further compares the aspect ratio of the display being generated with the aspect ratio of the first content 140 and determines whether the two aspect ratios are equal or different. In another embodiment, the aspect ratio detector 126 further compares the size of the first content region associated with the first content 140 with the size of the display being generated and determines whether the two sizes are equal or different. In an embodiment, the aspect ratio of the display being generated differs from that of the first content 140. The aspect ratio detector 126 determines that a plurality of unutilized regions will appear in the display being generated. In an embodiment, the size of the first content region associated with the first content 140 differs from the size of the display being generated. The aspect ratio detector 126 determines that the plurality of unutilized regions will appear in the display being generated. In an embodiment, the aspect ratio detector 126 determines the appearance and size of the plurality of unutilized regions based on the difference between the aspect ratio of the first content 140 and the aspect ratio of the display being generated. In another embodiment, the aspect ratio detector 126 determines the appearance and size of the plurality of unutilized regions based on the difference between the size of the first content region associated with the first content 140 and the size of the display being generated.

In an embodiment, if the aspect ratio detector 126 determines that the plurality of unutilized regions will appear, the consolidator 128 may scale up the size of the first content region such that the first content fills the display being generated. In another embodiment, if the aspect ratio detector 126 determines that the plurality of unutilized regions will appear, the consolidator 128 consolidates the plurality of unutilized regions to form a consolidated region. The consolidator 128 generates an output video signal having the consolidated region and a first content region associated with the first content. In an embodiment, the consolidator 128 may consolidate the plurality of unutilized regions based on availability of the second content 142. For example, when the second content 142 is unavailable, the consolidator 128 may not consolidate the plurality of unutilized regions. In an embodiment, the consolidator 128 consolidates the plurality of unutilized regions by, at least partially, moving the first content region towards at least one edge of the output video signal and forms the consolidated region. The consolidator 128 moves the first content region towards at least one edge of the output video signal to such an extent that size of the formed consolidated region is large enough for the second content 142. When the consolidator 128 partially moves the first content region towards at least one edge of the output video signal, even after forming the consolidated region, unutilized regions may still be present on either sides of the first content region. For example, the second content 142 associated with the consolidated region below a letterboxed movie may correspond to sub-titles. The size of the consolidated region associated with the sub-titles may be less than the size of the consolidated region that will be formed by consolidating the entire unutilized regions above and below the letterboxed movie. In such a case, the consolidator 128 consolidates the unutilized regions above and below the letterboxed movie such that some unutilized regions remains above the letterboxed movie, while a consolidated region is formed below the letterboxed movie. In another embodiment, the consolidator 128 maximizes the size of the consolidated region by aligning the first content region with at least one edge of the output video signal. The consolidator 128 consolidates the unutilized regions and/or maximizes the size of the consolidated region based on one or more rules. For example, the consolidator 128 consolidates the unutilized regions above and below the first content region to form a consolidated region that lies either above or below the first content region. Similarly, the consolidator 128 consolidates the unutilized regions on the right and left side of the first content region to form a consolidated region that lies on either the left or right side of the first content region. In another example, the consolidator 128 consolidates the unutilized regions on four sides (right side, left side, above, and below) of the first content region to form a consolidated region. The consolidated region lies on one side of the first content region, thus creating a larger region associated with the second content 142. The consolidation of the plurality of unutilized regions is described below in conjunction with FIG. 2 and FIG. 3. In an embodiment, the consolidator 128 determines at least one edge of the output video signal for aligning the first content region based on the location of the plurality of unutilized regions. In another embodiment, the consolidator 128 determines the at least one edge of the output video signal for aligning the first content region based on at least one of user customized setting provided through the server 108 or one or more rules provided by the server 108. The user customized settings and the one or more rules determines the preference between moving the first content region towards either top edge, bottom edge, left edge, or right edge of the output video signal. In another embodiment, the consolidator 128 consolidates the plurality of unutilized regions by scaling down the size of the first content region without moving the first content region. In another embodiment, the consolidator 128 consolidates the plurality of unutilized regions by scaling down the size of the first content region and moving the first content region towards at least one edge of the output video signal. In an embodiment, the consolidator 128 may scale down the size of the first content region prior to moving the first content region towards at least one edge of the output video signal. In another embodiment, the consolidator 128 may scale down the size of the first content region subsequent to moving the first content region towards at least one edge of the output video signal.

In an embodiment, the signal-processing device 102 defines the one or rules associated with utilization of the consolidated region. In an embodiment, the rules generator 129 defines each rule based on at least one of a first set of parameters associated with the user associated with the signal-processing device 102, a second set of parameters associated with the content provider 106, metadata associated with the first content 140, or the second content 142. The device manager 132 determines the first set of parameters. In another embodiment, the signal-processing device 102 receives one or more rules from the content provider 106 and/or the server 108. The one or more rules are stored as the rules data 144 in the program data 122.

The rules engine 130 fetches the one or more rules associated with the utilization of the consolidated region stored as the rules data 144 in the program data 122. The rules engine 130 utilizes the one or more rules to determine how and which second content to associate with the consolidated region. The rules engine 130 selects the second content 142 based on the one or more rules. In an embodiment, the rules engine 130 determines importance of the second content 142 as compared to the first content 140 based on the one or more rules.

The device manager 132 manages the settings of the signal-processing device 102. In an embodiment, the device manager 132 presents a device-setting menu on the display screen 114. The device-setting menu provides a user option to control various settings, such as display settings, audio settings, associated with the signal-processing device 102. The user can use the user input device 116 to traverse through the device-setting menu and select one or more setting options. The device manager 132 stores the selected setting options as the device data 138. In another embodiment, the device manager 132 receives the user customized setting of the signal-processing device 102 from the server 108 and stores the received settings as the device data 138. In an embodiment, the aspect ratio and the size of the display screen 114 are also stored as the device data 138. In another embodiment, the aspect ratio and the size of the display being generated are also stored as the device data 138.

The device manager 132 determines a first set of parameters associated with the user of the signal-processing device 102. In an embodiment, the device manager 132 determines the first set of parameters based on the user's interaction with the signal-processing device 102. In another embodiment, the device manager 132 receives the first set of parameters from the server 108 through the receiver 112. The device manager 132 stores the first set of parameters as the user data 136. In an embodiment, the device manager 132 may further present a user interface on the display screen 114. The user interface may provide options to the user of the signal-processing device 102 to control the first content 140 and the second content 142. For example, the user interface may provide options to the user of the signal-processing device 102 to control display of the first content 140 and the second content 142 on the display screen 114. In another example, the user interface may provide options to the user of the signal-processing device 102 to specify format of the output video signal for storing as the other data 146 in the program data 122. In an embodiment, the user interface allows the user to provide an instruction to swap the first content 140 associated with the first content region with at least a portion of the second content 142 associated with the consolidated region.

The signal manager 134 controls utilization of the first content region and the consolidated region of the output video signal. In an embodiment, the signal manager 134 manages the first content 140 associated with the first content region and the second content 142 associated with the consolidated region based on one or more inputs provided by the user through the user interface. The signal manager 134 further determines the size of the consolidated region required based on the second content 142. Based on the importance and the required size, the signal manager 134 determines whether the consolidated region of different size is required. Based on the determination, the signal manager 134 may change size of the consolidated region by scaling the size of the first content region. For example, the signal manager 134 can enlarge the size of the consolidated region by scaling down the size of the first content region. This may occur when the second content 142 associated with the consolidated region is important as compared to the first content 140 associated with the first content region. This may also occur when the size of the consolidated region associated with the second content 142 exceeds the size of the consolidated region formed by consolidation of the plurality of unutilized regions. To scale down the size of first content region, the signal manager 134 adds black bars on one or both sides of the first content region such that the black bars are perpendicular to the consolidated region. Similarly, the signal manager 134 can reduce the size of the consolidated region by scaling up the size of the first content region. This may occur when the first content 140 associated with the first content region is important as compared to the second content 142 associated with the consolidated region. This may also occur when the size of the consolidated region associated with the second content 142 is less than the size of the consolidated region formed by consolidation of the plurality of unutilized regions. In an embodiment, if the consolidated region is not present and the second content 142 is available, the signal manager 134 may reduce the size of the first content region to generate the consolidated region associated with the second content 142. The signal manager 134 reduces the size of the first content region based on size of the consolidated region required for the second content 142. In some embodiments, the signal manager 134 is capable of generating metadata associated with the first content 140. The signal manager 134 stores the generated metadata as the other data 146 for later usage.

The signal manager 134 manages the second content 142 associated with the consolidated region such that the second content 142 does not distract the user associated with the signal-processing device 102. For example, the signal manager 134 calculates discontinuity between each frame of the first content 140 associated with the first content display region and the second content 142 associated with the consolidated region. The signal manager 134 detects changes in the first content 140 and the second content 142 based on the calculated discontinuity. The signal manager 134 further synchronizes the change in the second content 142 with change in the first content 140. Such synchronization makes the change in the second content 142 less noticeable to the user.

In an embodiment, the signal manager 134 automatically reduces the contrast between the second content 142 associated with the consolidated region and the first content 140 associated with the first content region by adjusting the color and brightness of the second content 142 based on color and brightness of the first content 140. For example, the signal manager 134 reduces the brightness of the consolidated region when the first content 140 is dark and brightens the consolidated region when the first content 140 is bright. Similarly, when the second content 142 includes bright colors and high contrast, the signal manager 134 changes the colors and contrast to dark shades of gray and medium contrast respectively such that the second content 142 does not distract the user. In another example, if the first content 140 includes sepia-tone coloration, the signal manager 134 adjusts the coloration of the second content 142 associated with the consolidated region to be similar to that of the first content 140. The signal manager 134 performs such adjustments by using various image-editing algorithms. In another embodiment, the signal manager 134 manages the first content 140 and the second content 142 based on one or more inputs provided by the user through the user interface.

In an embodiment, the signal manager 134 further adjusts an orientation of the second content 142 based on an orientation of the consolidated region in the output video signal. For example, if the consolidated region is on a side of the first content region and a text, such as the program title, is associated with the consolidated region, the signal manager 134 rotates the text by 90 degrees so that it can fit in the consolidated region. In another embodiment, the signal manager 134 may arrange multiple second content 142 either horizontally or vertically to best fit the consolidated region. The signal manager 134 may also be able to choose between a horizontal or vertical layout for the second content 142 associated with the consolidated region. For example, the signal manager 134 may associate a widget horizontally in a short and wide form, or vertically in a tall and skinny form in the consolidated region. The signal manager 134 may scale up and/or down size of the second content based on the size of the consolidated region. For example, if the size of the consolidated region is larger than the size of the second content, the signal manager 134 may increase the size of the second content to fill the consolidated region.

In an embodiment, the output video signal may be rendered for display on the display screen 114. In such a case, the signal manager 134 displays the first content 140 and optionally the second content 142 on the display screen 114. The signal manager 134 displays the first content 140 within a first content display region on the display screen 114. The first content display region of the display screen 114 corresponds to the first content region of the output video signal. The signal manager 134 further displays the second content 142 within a consolidated display region on the display screen 114. The consolidated display region of the display screen 114 corresponds to the consolidated region of the output video signal. When the second content 142 is not available for display, the signal manager 134 does not display any content in the consolidated display region. In an embodiment, the user may provide an instruction to swap the first content 140 displaying in the first content display region with at least a portion of the second content 142 displaying in the consolidated display region. The second content may include one or more visual indicators that may indicate to the user how to trigger a second content for swapping with the first content. On receiving the swapping instruction from the user, the signal manager 134 swaps the first content 140 with at least a portion of the second content 142. Thereafter, the first content display region displays the portion of the second content 142 swapped with the first content and the consolidated display region displays the first content 140 along with remaining portion, if any, of the second content 142. For example, when the first content display region displays a video of a first game and the consolidated display region displays thumbnail videos of other games, the user may switch to one of the other games when something exciting happens in that game. Based on the user selection, the first content display region displays the other game in the first content display region and the consolidated display region displays a thumbnail of the first game. Similarly, the user may switch to a home surveillance video displayed in the consolidated display region when the home surveillance video shows something of user's interest. In another example, when the first content display region displays a first video and the consolidated display region displays a second video along with other content, the user can swap the first video with the second video only. The other content displayed in the consolidated display region remains unaffected by the swap.

One may appreciate that extension of the disclosed embodiments can occur to include one or more blocks in the program module, that can enable the signal-processing device 102 to perform additional functions. A person skilled in the art would appreciate that the one or more modules of the signal-processing device 102 can be combined together to form a single module that is capable of performing various functions of the signal-processing device 102.

Figure 2:
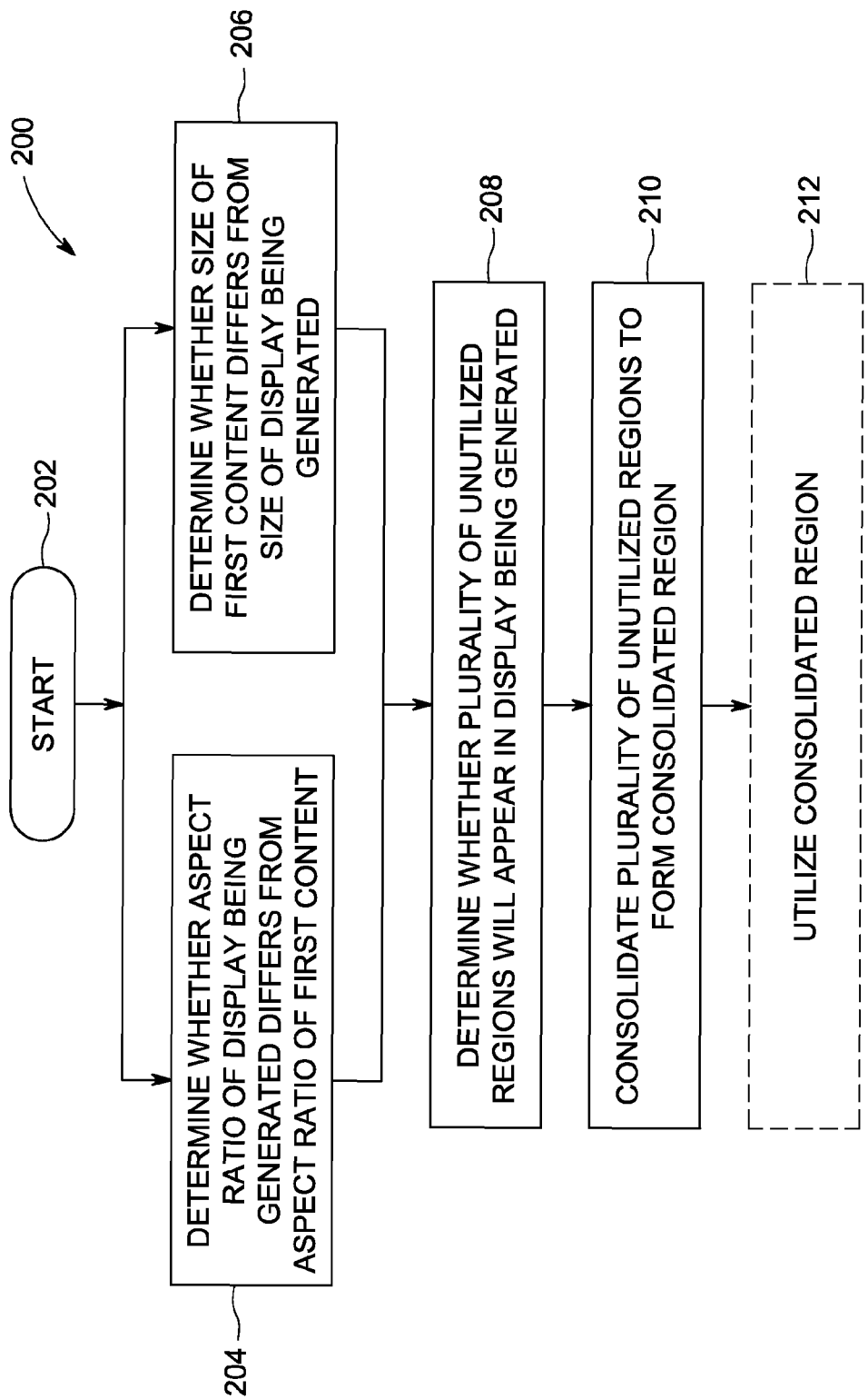
FIG. 2 is a flow diagram representing a computer-implemented method for processing a video signal in accordance with an embodiment.

FIG. 2 is a flow diagram 200 representing a computer-implemented method for processing a video signal in accordance with an embodiment. The flow diagram 200 is described in conjunction with the block diagram of FIG. 1.

The flow diagram 200 starts at step 202. At step 204, the aspect ratio detector 126 determines whether the aspect ratio of the display being generated differs from the aspect ratio of the first content 140. The aspect ratio detector 126 compares the aspect ratio of the display being generated with the aspect ratio of the first content 140 and determines whether the two aspect ratios are equal or different.

At step 206, the aspect ratio detector 126 determines whether size of the first content 140 differs from size of the display being generated. The aspect ratio detector 126 further compares the size of the first content 140 with the size of the display being generated and determines whether the two sizes are equal or different.

At step 208, the aspect ratio detector 126 determines whether the plurality of unutilized regions will appear in the display being generated.

When switched on, the signal-processing device 102 receives the input video signal containing the first content 140 from the content provider 106 through the receiver 112. The content manager 124 extracts the first content 140 from the input video signal. In an embodiment, the aspect ratio detector 126 determines that the aspect ratio of the first content 140 and the aspect ratio of the display being generated by the signal-processing device differ. If the two aspect ratios differ, the aspect ratio detector 126 determines that the plurality of unutilized regions will appear in the display being generated. In another embodiment, the aspect ratio detector 126 determines that the size of the first content 140 differs from the size of the display being generated. If the two sizes differ, the aspect ratio detector 126 determines that the plurality of unutilized regions will appear in the display being generated. The method for determining the difference between the aspect ratios and the sizes is described below, in detail, in conjunction with FIG. 3a.

At step 210, based on the determination of appearance of the plurality of unutilized regions, the consolidator 128 consolidates the plurality of unutilized regions to form a consolidated display region. The consolidator 128 generates an output video signal having the consolidated region and a first content region associated with the first content 140. In an embodiment, the consolidator 128 forms the consolidated region by, at least partially, moving the first content region towards at least one edge of the output video signal. In another embodiment, the consolidator 128 forms the consolidated region by scaling down size of the first content region. The method for consolidating the plurality of unutilized regions is described below, in detail, in conjunction with FIG. 3b.

At step 212, the signal manager 134 utilizes the consolidated region. In some embodiments, the step 212 may be optional as represented by dashed box in the flow diagram 200. The method for utilizing the consolidated region is described below, in detail, in conjunction with FIG. 3d and FIG. 3e. The flow diagram 200 stops at step 214.

Figure 3A:
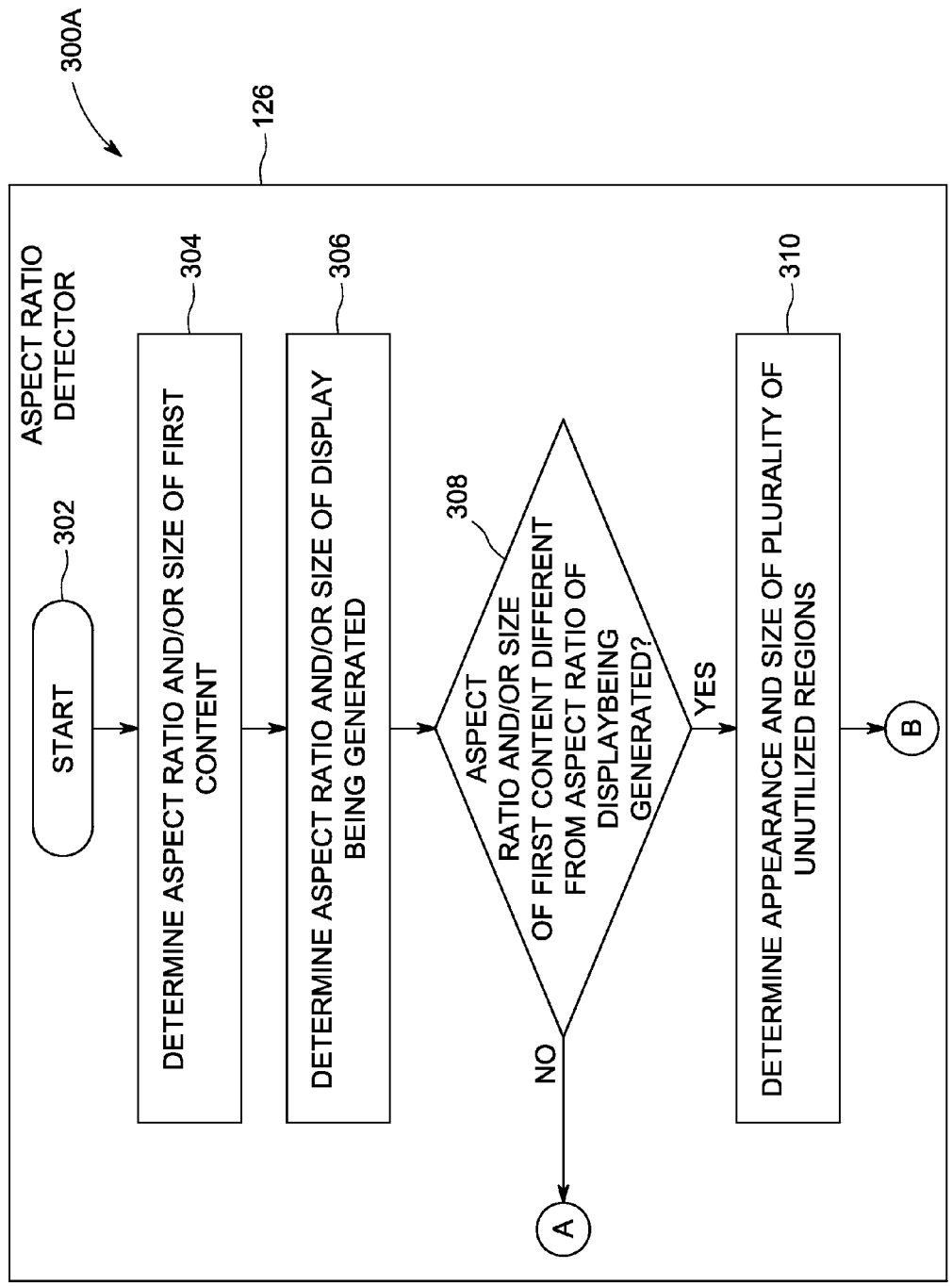
FIG. 3a illustrates a flow diagram representing a computer-implemented method for determining difference between the aspect ratio of first content and aspect ratio of the display being generated, and the difference between the size of the display being generated and the size of the first content, in accordance with an embodiment.

FIG. 3a illustrates a flow diagram 300a representing, in detail, a computer-implemented method for determining the difference between the aspect ratio of the first content 140 and the aspect ratio of the display being generated, and the difference between the size of the display being generated and the size of the first content, performed by the aspect ratio detector 126 in an embodiment. The flow diagram 300a is described in conjunction with the block diagram of FIG. 1 and flow diagram of FIG. 2.

The flow diagram 300a starts at step 302 and proceeds to step 304, wherein the aspect ratio detector 126 determines the aspect ratio and/or size of the first content 140.

At step 306, the aspect ratio detector 126 determines the aspect ratio and/or size of the display being generated from the program data 122 where it is stored as the device data 138. One may appreciate that the aspect ratio detector 126 may perform step 304 and step 306 in any order. One may also appreciate that the aspect ratio detector 126 may perform step 304 and step 306 simultaneously.

At step 308, the aspect ratio detector 126 determines whether the aspect ratio and/or the size of the first content 140 differs from the aspect ratio of the display being generated. If the aspect ratio and/or the size of the first content 140 are same as the aspect ratio of the display being generated, the method proceeds to step 320 of flow diagram 300c shown in FIG. 3c. Step 320 is described below, in detail, in with conjunction with FIG. 3c.

However, if at step 308, the aspect ratio detector 126 determines that the aspect ratio and/or the size of the first content differ from the aspect ratio and/or the size of the display being generated, the method proceeds to step 310.

At step 310, the aspect ratio detector 126 determines whether the plurality of unutilized regions will appear in the display being generated. In an embodiment, the aspect ratio detector 126 determines whether the plurality of unutilized regions will appear in the display being generated based on the difference between the aspect ratio of the first content 140 and the aspect ratio of the display being generated. In another embodiment, the aspect ratio detector 126 determines whether the plurality of unutilized regions will appear in the display being generated the based on the difference between the size of the first content and the size of the display being generated. In an embodiment, if the aspect ratio of the first content 140 and the aspect ratio of the display being generated differs, the aspect ratio detector 126 determines that the plurality of unutilized regions will appear. In another embodiment, if the size of the first content differs from the size of the display being generated, the aspect ratio detector 126 determines that the plurality of unutilized regions will appear. In an embodiment, if no difference exists between the aspect ratio of the first content 140 and the aspect ratio of the display being generated, the aspect ratio detector 126 determines that the plurality of unutilized regions will not appear. In another embodiment, if the size of the first content is same as the size of the display being generated, the aspect ratio detector 126 determines that the plurality of unutilized regions will not appear. In an embodiment, the aspect ratio detector 126 may use various display detection algorithms to determine whether the plurality of unutilized regions will appear. The display detecting algorithms detect discontinuities in one or more properties, such as color and intensity, of the pixels of the input video signal. Thereafter, the method proceeds to step 312 of flow diagram 300b shown in FIG. 3b.

Figure 3B:
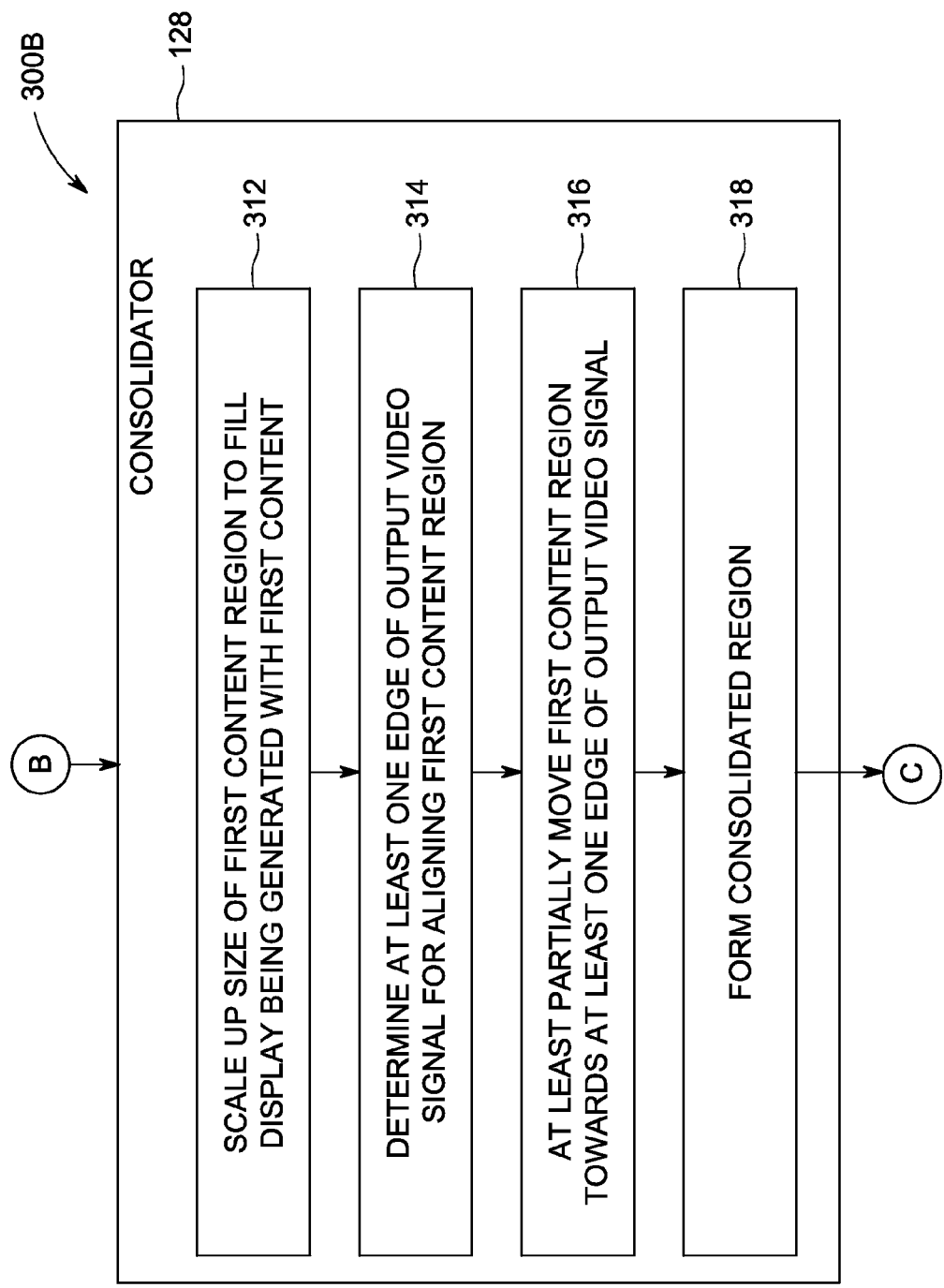
FIG. 3b is a flow diagram representing a computer-implemented method for consolidating plurality of unutilized regions and utilizing consolidated region in accordance with an embodiment.

FIG. 3b is a flow diagram 300b and 300c representing, in detail, a computer-implemented method for consolidating plurality of unutilized regions and utilizing consolidated region according to an embodiment. The flow diagram 300b is described in conjunction with the block diagram of FIG. 1, and flow diagrams of FIG. 2 and FIG. 3a.

If at step 310 aspect ratio detector 126 determines that the plurality of unutilized regions will appear, at step 312 the consolidator 128 may optionally scale up the size of first content region to fill the display being generated with the first content 140. The step 312 may be optional as represented by dashed box in the flow diagram 300b.

At step 314, in an embodiment, the 128 determines at least one edge of the output video signal towards which the first content region moves based on location of the plurality of unutilized regions. For example, when the consolidator 128 detects the plurality of unutilized regions above and below the first content region, the consolidator 128 determines whether to move the first content region towards a top edge of the output video signal, or with a bottom edge of the output video signal. Similarly, when the consolidator 128 detects the plurality of unutilized regions on the right and left side of the first content region, the consolidator 128 determines whether to move the first content region towards a left or a right edge of the output video signal. In another embodiment, at step 314, the consolidator 128 determines at least one edge of the output video signal for aligning the first content region based on location of the plurality of unutilized regions. In an embodiment, the consolidator 128 determines the edge based on a user input. In another embodiment, the consolidator 128 determines the edge based on the second content 142 associated with the consolidated region.

At step 316, based on the determination at the step 314, in an embodiment, the consolidator 128, at least partially, moves the first content region towards at least one edge of the output video signal. In another embodiment, at step 316, the consolidator 128 moves the first content region such that it aligns with the detected edge of the output video signal. Aligning the consolidated region with the detected edge of the output video signal maximizes the size of the consolidated region. The consolidator 128 moves and aligns the consolidated region using techniques known in the art.

At step 318, the consolidator 128 forms the consolidated region. In an embodiment, when the first content region at least partially moves towards the detected edge of the output video signal, the consolidator 128 consolidates the plurality of unutilized regions and forms the consolidated region on one side of the first content region. For example, by at least partially moving the first content region towards the top edge of the output video signal, the consolidator 128 consolidates the unutilized regions on the top and bottom of the first content region. The consolidator 128 forms the consolidated region below the first content region. In another embodiment, when the first content region aligns with the detected edge of the output video signal, the consolidator 128 consolidates the plurality of unutilized regions and forms the consolidated region on one side of the first content region. In another embodiment, the consolidator 128 may consolidate the plurality of unutilized regions based on size of the second content 142. Examples of formation of consolidated display region on a display screen are described below, in detail, in conjunction with FIG. 4, FIG. 5, FIG. 6, FIG. 7 and FIG. 8. In another embodiment, the consolidator 128 may scale down the size of the first content region to form the consolidated region. Thereafter, the method proceeds to step 320 of flow diagram 300c shown in FIG. 3c.

Figure 3C:
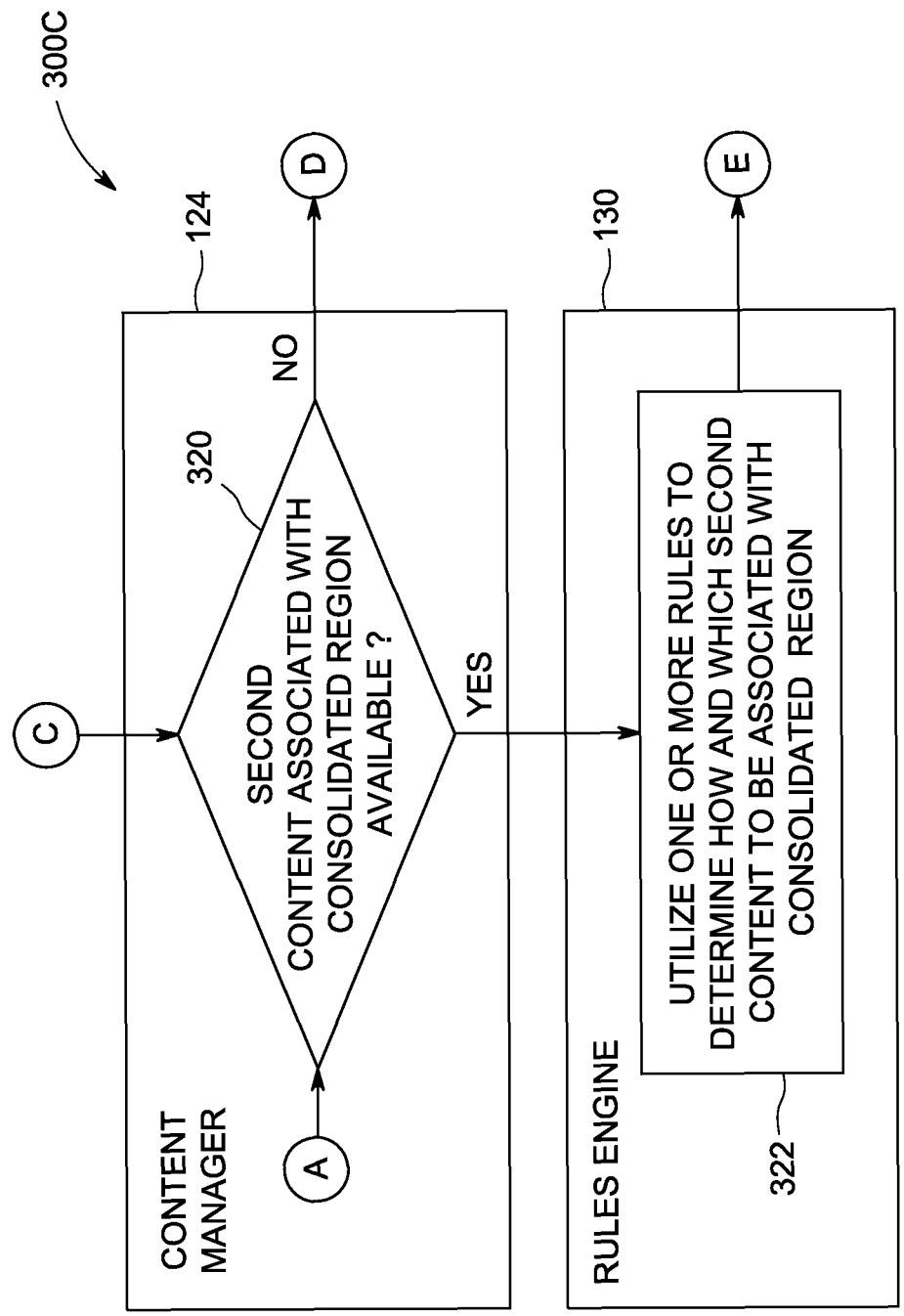
FIG. 3c, FIG. 3d, and FIG. 3e is a flow diagram representing a computer-implemented method for associating first content with the first content region and second content with the consolidated region in accordance with an embodiment.

FIG. 3c is a flow diagram 300c representing a computer-implemented method for associating the first content 140 with the first content region and the second content 142 with the consolidated region, in an embodiment. The flow diagram 300c is described in conjunction with the block diagram of FIG. 1, and flow diagrams of FIG. 2, FIG. 3a, and FIG. 3b.

At step 320, the content manager 124 determines whether the second content 142 is available. If the second content 142 is not available, the method proceeds to step 346 of flow diagram 300c of FIG. 3e in an embodiment. The step 346 is described below, in detail, in with conjunction with FIG. 3e.

However, if at step 320 the content manager 124 determines that the second content 142 is available, the method proceeds to step 322.

At step 322, the rules engine 130 utilizes the one or more rules to determine how and which second content to associate with the consolidated region. Thereafter, the method proceeds to step 324 of flow diagram 300c shown in FIG. 3d.

Figure 3D:
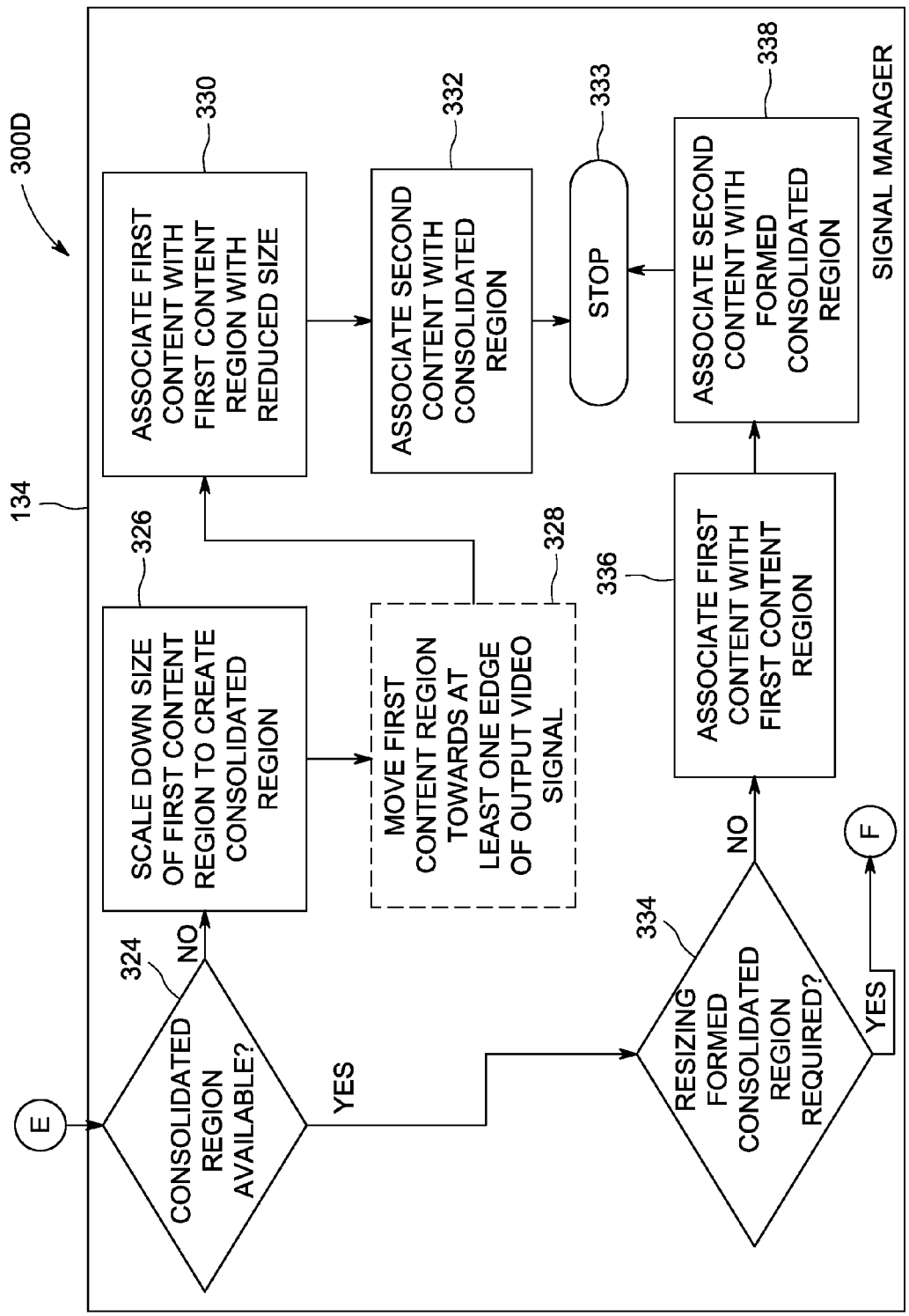
Figure 3E:
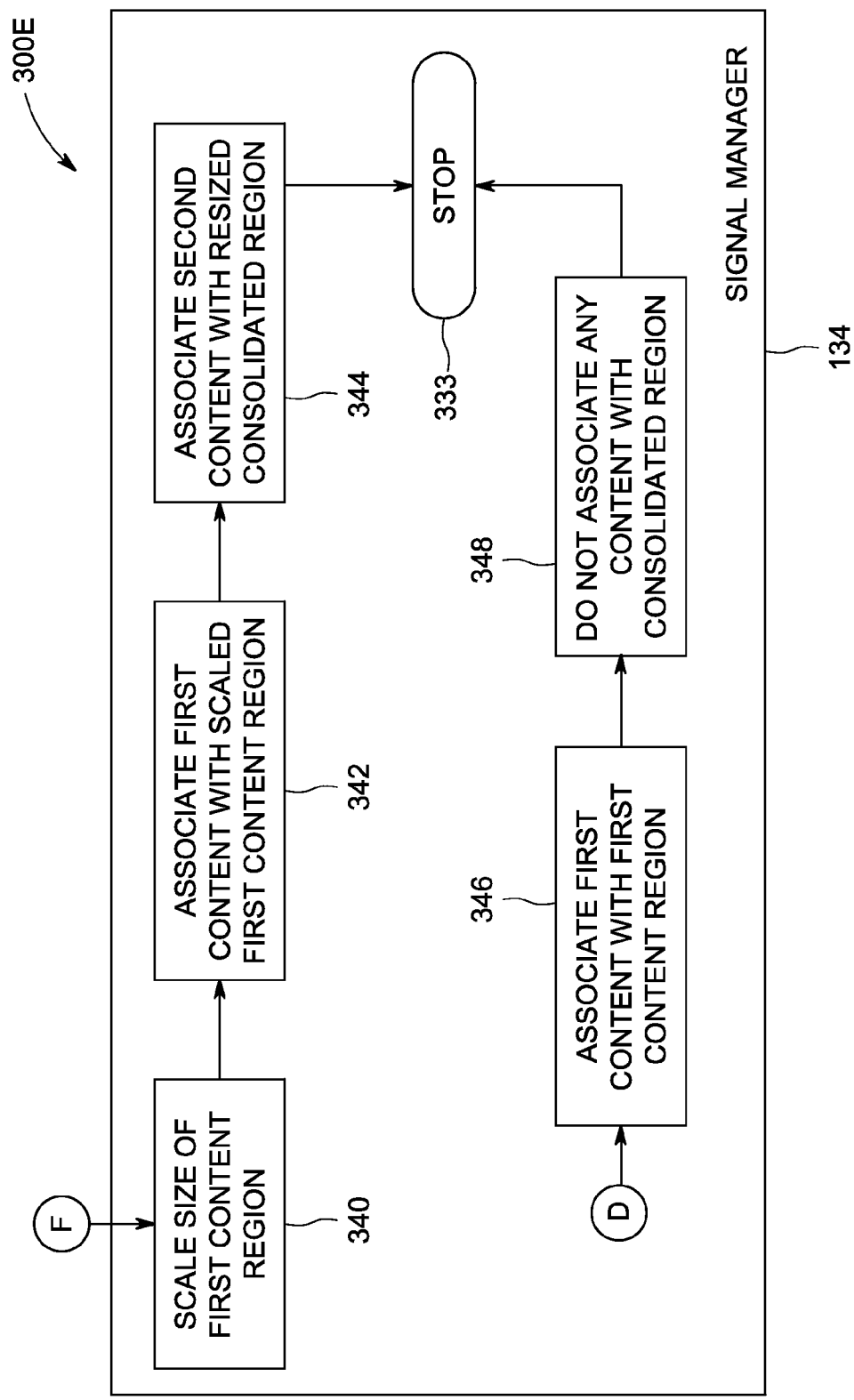

FIGS. 3d and 3e is a flow diagram 300c representing a computer-implemented method for associating the first content 140 with the first content region and the second content 142 with the consolidated region, performed by the signal manager 134, in an embodiment. The flow diagram 300c is described in conjunction with the block diagram of FIG. 1, and flow diagrams of FIG. 2, FIG. 3a, FIG. 3b, and FIG. 3c.

Based on the determination by the rules engine 130 at step 322, the signal manager 134 performs the step 324. At step 324, the signal manager 134 determines whether a consolidated region is available. In an embodiment, the consolidated region will not be available if the aspect ratio of the first content 140 and the aspect ratio of the display being generated are equal. In another embodiment, the consolidated region will not be available if the size of the first the first content 140 is same as the size of the display being generated. If at step 324, the signal manager 134 determines that the consolidated region is not available, the signal manager 134 scales down size of the first content to create consolidated region at step 326. At step 328, the signal manager 134 may optionally move the first content region towards at least one edge of the output video signal. At step 330, the signal manager 134 associates the first content 140 with the first content region with reduced size. At step 332, the signal manager 134 associates the second content 142 with the consolidated region. One may appreciate that the signal manager 134 may perform step 328 and step 330 in any order. One may also appreciate that the signal manager 134 may perform step 328 and step 330 simultaneously. Thereafter, the method proceeds to step 333 wherein the method stops.

However, if at step 324, the signal manager 134 determines that the consolidated region is available, the signal manager 134 determines, at step 334, whether resizing the formed consolidated region is required. The signal manager 134 performs the determination of step 334 based on the one or more rules. If at step 334, the signal manager 134 determines that resizing the formed consolidated region is not required, the method proceeds to step 336. At step 336, the signal manager 134 associates the first content 140 with the first content region. At step 338, the signal manager 134 associates the second content 142 with the formed consolidated region. One may appreciate that the signal manager 134 may perform step 336 and step 338 in any order. One may also appreciate that the signal manager 134 may perform step 336 and step 338 simultaneously. Thereafter, the method proceeds to step 333 wherein the method stops.

However, if at step 334 the signal manager 134 determines that resizing the formed consolidated region is required, the method proceeds to step 340 of flow diagram 300c shown in FIG. 3e. At step 340, the signal manager 134 scales the size of the first content region. In an embodiment, at step 340, the signal manager 134 scales down the size of the first content region. As a result, the signal manager 134 enlarges the formed consolidated region. In another embodiment, at step 340, the signal manager 134 scales up the size of the first content region when the second content 142 requires smaller consolidated region.

At step 342, the signal manager 134 associates the first content 140 with the scaled first content region. At step 344, the signal manager 134 associates the second content 142 with the resized consolidated region. One may appreciate that the signal manager 134 may perform step 342 and step 344 in any order. One may also appreciate that the signal manager 134 may perform step 342 and step 344 simultaneously. Thereafter, the method proceeds to step 333 wherein the method stops.

If at step 320, the content manager 124 determines that the second content 142 is not available, the signal manager 134, at step 346, associates the first content 140 with the first content region. At step 348, the signal manager 134 does not associate any content with the consolidated region. For example, when the signal-processing device 102 does not receive any second content 142 associated with the consolidated display region, the signal manager 134 associates the first content 140 with the first content region aligned with the top edge of the output video signal and does not associates any content with the consolidated region below the first content region. One may appreciate that the signal manager 134 may perform step 346 and step 348 in any order. One may also appreciate that the signal manager 134 may perform step 346 and step 348 simultaneously. Thereafter, the method proceeds to step 333 wherein the method stops.

For example, the first content 140 associates with the first content region is live video of a cricket match. The rules engine 130 utilizes a rule that the additional information about the first content 140 is associated with the consolidated region. The aspect ratio detector 126 determines whether an aspect ratio of the display being generated and an aspect ratio of the live video are different. If the two aspect ratios are different, the consolidator 128 aligns the first content region with the top edge of the output video signal and forms the consolidated region below the first content region. The signal-processing device may render the output video signal having the first content region and the consolidated region for display on the display screen 114. The signal manager 134 displays the cricket match video within the first content display region aligned with the top edge of the display screen 114. Based on the rule, the signal manager 134 displays information, such as history of the city hosting the cricket match, profile of players playing the match, team statistics, scores, and time remaining for the match, within the consolidated display region of the display screen 114.

Figure 4:
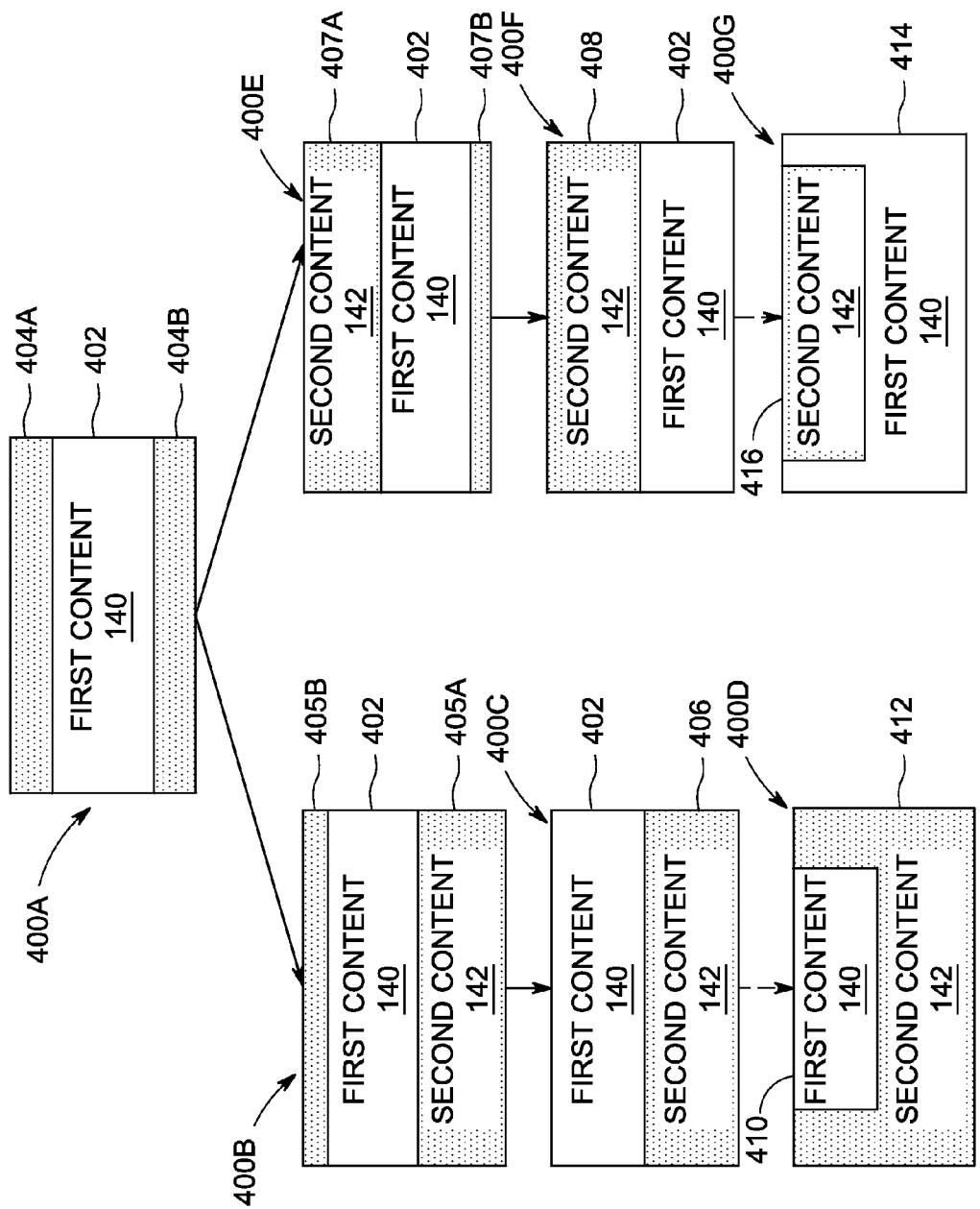
FIG. 4 illustrates formation of consolidated display region in an output video signal having a first content region with more width than height in accordance with an embodiment.

FIG. 4 illustrates formation of consolidated region in an output video signal having a first content region with the width more than the height, in accordance with an embodiment. FIG. 4 is described in conjunction with the block diagram of FIG. 1 and the flow diagrams of FIG. 2, FIG. 3a, FIG. 3b, FIG. 3c, and FIG. 3d.

FIG. 4 shows a display being generated 400a when the aspect ratio of the first content 140 differs from an aspect ratio of the display being generated 400a. The display 400a may also be generated when the size of the first content region differs from the size of the display being generated 400a. The display being generated 400a shows a first content region 402 with more width than height (e.g., a letterbox format). The first content region 402 is associated with the first content 140. As shown, unutilized regions 404a and 404b appear above and below the first content region 402 respectively. The signal-processing device 102 may modify the display being generated 400a according to various embodiments of the disclosure to form an output video signal. The output video signal may be stored in frame buffer in the signal-processing device 102 and/or rendered for display on the display screen 114. In an embodiment, the consolidator 128 consolidates the unutilized regions 404a and 404b by, at least partially, moving the first content region 402 towards either a top or a bottom edge of the display being generated 400a.

FIG. 4 shows an output video signal 400b that includes the first content region 402 and a consolidated region 405a. The output video signal 400b shows the first content region 402 moved towards the top edge of the output video signal 400b. The consolidator 128 consolidates the unutilized regions 404a and 404b, and forms the consolidated region 405a below the first content region 402. Due to movement of the unutilized regions 404a and 404b, an unutilized region 405b remains above the first content region 402. In an embodiment, the signal manager 134 simultaneously associates the second content 142 with the consolidated region 405a and the first content 140 with the first content region 402. In another embodiment, the signal manager 134 simultaneously associates the second content 142 with the unutilized region 405b and the first content 140 with the first content region 402. In still another embodiment, the signal manager 134 simultaneously associates the first content 140 with the first content region 402 and the second content 142 with the consolidated region 405a and the unutilized region 405b. The consolidated region 405a and the unutilized region 405b may be associated with the same or different second content 142.

In another embodiment, the consolidator 128 maximizes the consolidated region 405a by aligning the first content region 402 with the top of the output video signal 400b.

FIG. 4 shows an output video signal 400c that includes the first content region 402 and a consolidated region 406. The output video signal 400c shows the first content region 402 aligned with the top edge of the output video signal 400c. The consolidator 128 consolidates the unutilized regions 404a and 404b and forms the consolidated region 406 below the first content region 402. The consolidated region 406 is the consolidated region having maximum possible size without scaling down the size of the first content region 402. The signal manager 134 simultaneously associates the second content 142 with the consolidated region 406 and the first content 140 with the first content region 402. Further, signal manager 134 may change the size of the consolidated region 406 by scaling the first content region 402.

FIG. 4 shows an output video signal 400d that includes a scaled-down first content region 410. If the second content 142 is more important than the first content 140 and/or a larger consolidated region is required for the second content 142, the signal manager 134 reduces the size of the first content region 402. Thus, the signal manager 134 forms the scaled-down first content region 410 and an enlarged consolidated region 412. The size of the enlarged consolidated region 412 is more than the size of the consolidated region 406.

FIG. 4 shows an output video signal 400e that includes the first content region 402 and a consolidated region 407a. The output video signal 400e shows the first content region 402 moved towards the bottom edge of the output video signal 400e. The consolidator 128 consolidates the unutilized regions 404a and 404b and forms the consolidated region 407a above the first content region 402. Due to movement of the unutilized regions 404a and 404b, an unutilized region 407b remains below the first content region 402. In an embodiment, the signal manager 134 simultaneously associates the second content 142 with the consolidated region 407a and the first content 140 with the first content region 402. In another embodiment, the signal manager 134 simultaneously associates the second content 142 with the unutilized region 407b and the first content 140 with the first content region 402. In still another embodiment, the signal manager 134 simultaneously associates the first content 140 with the first content region 402 and the second content 142 with the consolidated region 407a and the unutilized region 407b. The consolidated region 407a and the unutilized region 407b may be associated with the same or different second content 142.

In another embodiment, the consolidator 128 maximizes the consolidated region 407a by aligning the first content region 402 with the bottom edge of the output video signal 400e.

FIG. 4 shows an output video signal 400f that includes the first content region 402 and a consolidated region 408. The output video signal 400f shows the first content region 402 aligned with the bottom edge of the output video signal 400f. The consolidator 128 consolidates the unutilized regions 404a and 404b and forms the consolidated region 408 above the first content region 402. The consolidated region 408 is the consolidated region having maximum possible size without scaling down the size of the first content region 402. The signal manager 134 associates the second content 142 with the consolidated region 408 and the first content 140 with the first content region 402. Further, signal manager 134 may change the size of the consolidated region 408 by scaling the first content region 402.

FIG. 4 shows an output video signal 400g that includes a scaled-up first content region 414. If the first content 140 is more important than the second content 142 and/or a smaller consolidated region is required for the second content 142, the signal manager 134 increases the size of the first content region 402. Thus, the signal manager 134 forms the scaled-up first content region 414 and a reduced consolidated region 416. Hence, the size of the reduced consolidated region 416 is less than the size of the consolidated region 408. In an embodiment, the signal manager 134 increases size of the scaled-up first content region 414 to such an extent that the scaled-up first content region 414 covers the entire output video signal 400g. In such a case, no consolidated region will appear in the output video signal 400g.

Figure 5:
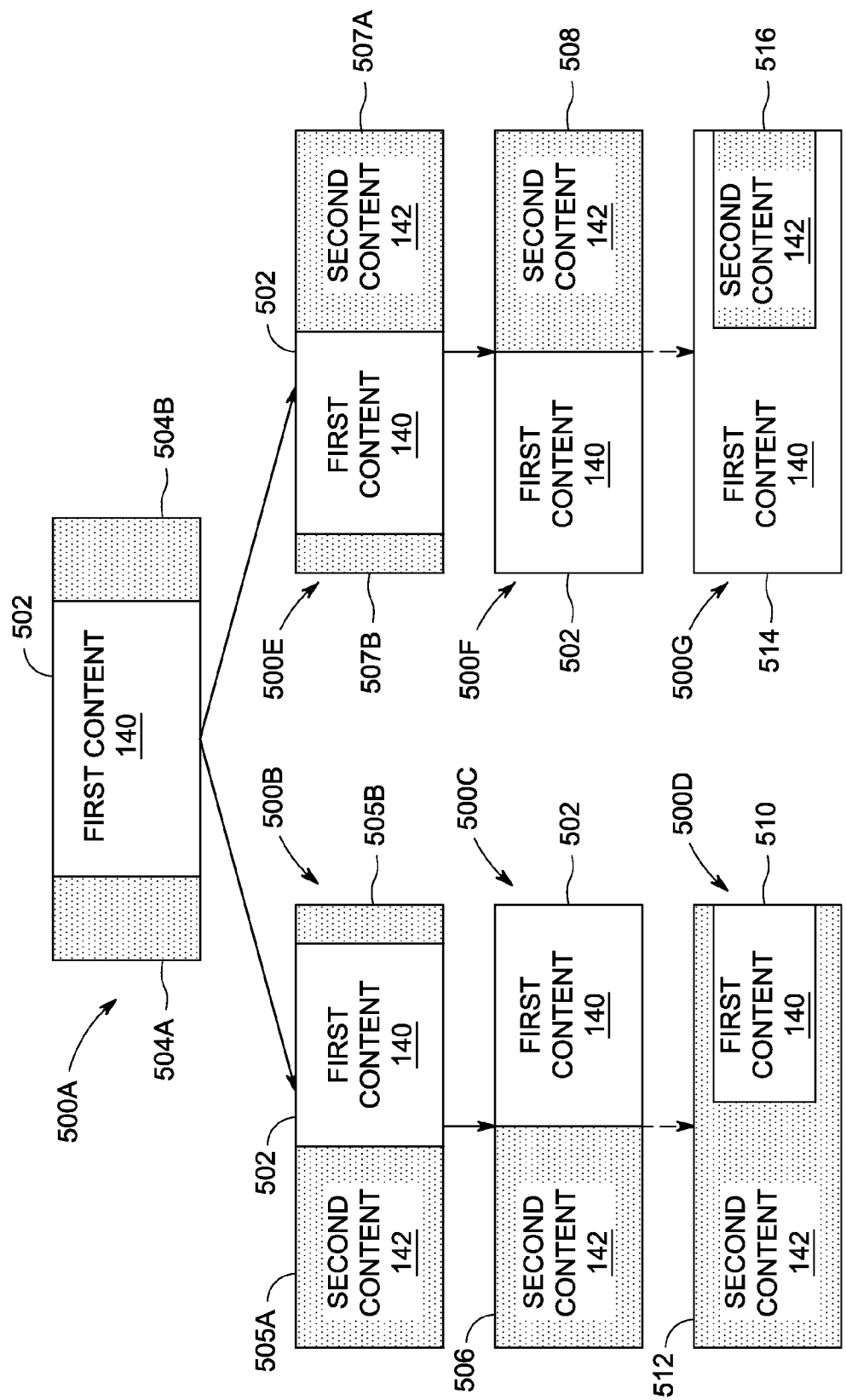
FIG. 5 illustrates formation of consolidated display region in an output video signal having a first content region with more height than width in accordance with an embodiment.

FIG. 5 illustrates formation of consolidated region in an output video signal having a first content region with more height than width in accordance with an embodiment. FIG. 5 is described in conjunction with the block diagram of FIG. 1 and the flow diagrams of FIG. 2, FIG. 3a, FIG. 3b, FIG. 3c, and FIG. 3d.

FIG. 5 shows a display being generated 500a when the aspect ratio of the first content 140 differs from an aspect ratio of the display being generated 500a. The display 500a may also be generated when the size of the first content region differs from the size of the display 500a being generated. The display being generated 500a shows a first content region 502 with more height than width (e.g., a pillarbox format). The first content region 502 is associated with the first content 140. As shown, unutilized regions 504a and 504b appear respectively on the left and right side of the first content region 502. The signal-processing device 102 may modify the display being generated 500a according to various embodiments of the disclosure to form an output video signal. The output video signal may be stored in frame buffer in the signal-processing device 102 and/or rendered for display on the display screen 114. In an embodiment, the consolidator 128 consolidates the unutilized regions 504a and 504b by, at least partially, moving the first content region 502 towards either a left or a right edge of the display being generated 500a.

FIG. 5 shows an output video signal 500b that includes a first content region 502 and a consolidated region 505a. The output video signal 500b shows the first content region 502 moved towards the right edge of the output video signal 500b. The consolidator 128 consolidates the unutilized regions 504a and 504b and forms the consolidated region 505a on the left side of the first content region 502. Due to movement of the unutilized regions 504a and 504b, an unutilized region 505b remains on the right side of the first content region 502. In an embodiment, the signal manager 134 simultaneously displays the second content 142 within the consolidated region 505a and the first content 140 within the first content region 502. In another embodiment, the signal manager 134 simultaneously associates the second content 142 with the unutilized region 505b and the first content 140 with the first content region 502. In still another embodiment, the signal manager 134 simultaneously associates the first content 140 with the first content region 502 and the second content 142 with the consolidated region 505a and the unutilized region 505b. The consolidated region 505a and the unutilized region 505b may be associated with the same or different second content 142.

In another embodiment, the consolidator 128 maximizes the consolidated region 505a by aligning the first content region 502 with the right edge of the output video signal 500b.

FIG. 5 shows an output video signal 500c that includes the first content region 502 and a consolidated region 506. The output video signal 500c shows the first content region 502 aligned with the right edge of the output video signal 500c. The consolidator 128 consolidates the unutilized regions 504a and 504b and forms the consolidated region 506 on the left side of the first content region 502. The consolidated region 506 is the consolidated region having maximum possible size without scaling down the size of the first content region 502. The signal manager 134 simultaneously associates the second content 142 with the consolidated region 506 and the first content 140 with the first content region 502. Further, signal manager 134 may change the size of the consolidated region 506 by scaling the first content region 502.

FIG. 5 shows an output video signal 500d that includes a scaled-down first content region 510. If the second content 142 is more important than the first content 140 and/or a larger consolidated region is required for the second content 142, the signal manager 134 reduces the size of the first content region 502. Thus, the signal manager 134 forms the scaled-down first content region 510 and an enlarged consolidated region 512. The size of the enlarged consolidated region 512 is more than the size of the consolidated region 506.

FIG. 5 shows an output video signal 500e that includes the first content region 502 and a consolidated region 507a. The output video signal 500e shows the first content region 502 moved towards the left edge of the output video signal 500e. The consolidator 128 consolidates the unutilized regions 504a and 504b, and forms the consolidated region 507a on the right side of the first content region 502. Due to movement of the unutilized regions 504a and 504b, an unutilized region 507b remains on the left side of the first content region 502. In an embodiment, the signal manager 134 simultaneously associates the second content 142 with the consolidated region 507a and the first content 140 with the first content region 502. In another embodiment, the signal manager 134 simultaneously associates the second content 142 with the unutilized region 507b and the first content 140 with the first content region 502. In still another embodiment, the signal manager 134 simultaneously associates the first content 140 with the first content region 402 and the second content 142 with the consolidated region 507a and the unutilized region 507b. The consolidated region 507a and the unutilized region 507b may be associated with the same or different second content 142.

In another embodiment, the consolidator 128 maximizes the consolidated region 507a by aligning the first content region 502 with the left edge of the output video signal 500d.

FIG. 5 shows an output video signal 500f that includes the first content region 502 and a consolidated region 508. The output video signal 500f shows the first content region 502 aligned with the left edge of the output video signal 500f. The consolidator 128 consolidates the unutilized regions 504a and 504b and forms the consolidated region 508 on the right side of the first content region 502. The consolidated region 508 is the consolidated region having maximum possible size without scaling down the size of the first content region 502. The signal manager 134 simultaneously associates the second content 142 with the consolidated region 508 and the first content 140 with the first content region 502. Further, signal manager 134 may change the size of the consolidated region 408 by scaling the first content region 502.

FIG. 5 shows an output video signal 500g that includes a scaled-up first content region 514. If the first content 140 is more important than the second content 142 and/or a smaller consolidated region is required for the second content 142, the signal manager 134 may increase the size of the first content region 502. Thus, the signal manager 134 forms the scaled-up first content region 514 and a reduced consolidated region 516. Hence, the size of the reduced consolidated region 516 is less than the size of the consolidated region 508. In an embodiment, the signal manager 134 increases size of the scaled-up first content region 514 to such an extent that the scaled-up first content region 514 covers the entire output video signal 500g. In such a case, no consolidated region will appear in the output video signal 500g.

Figure 6:
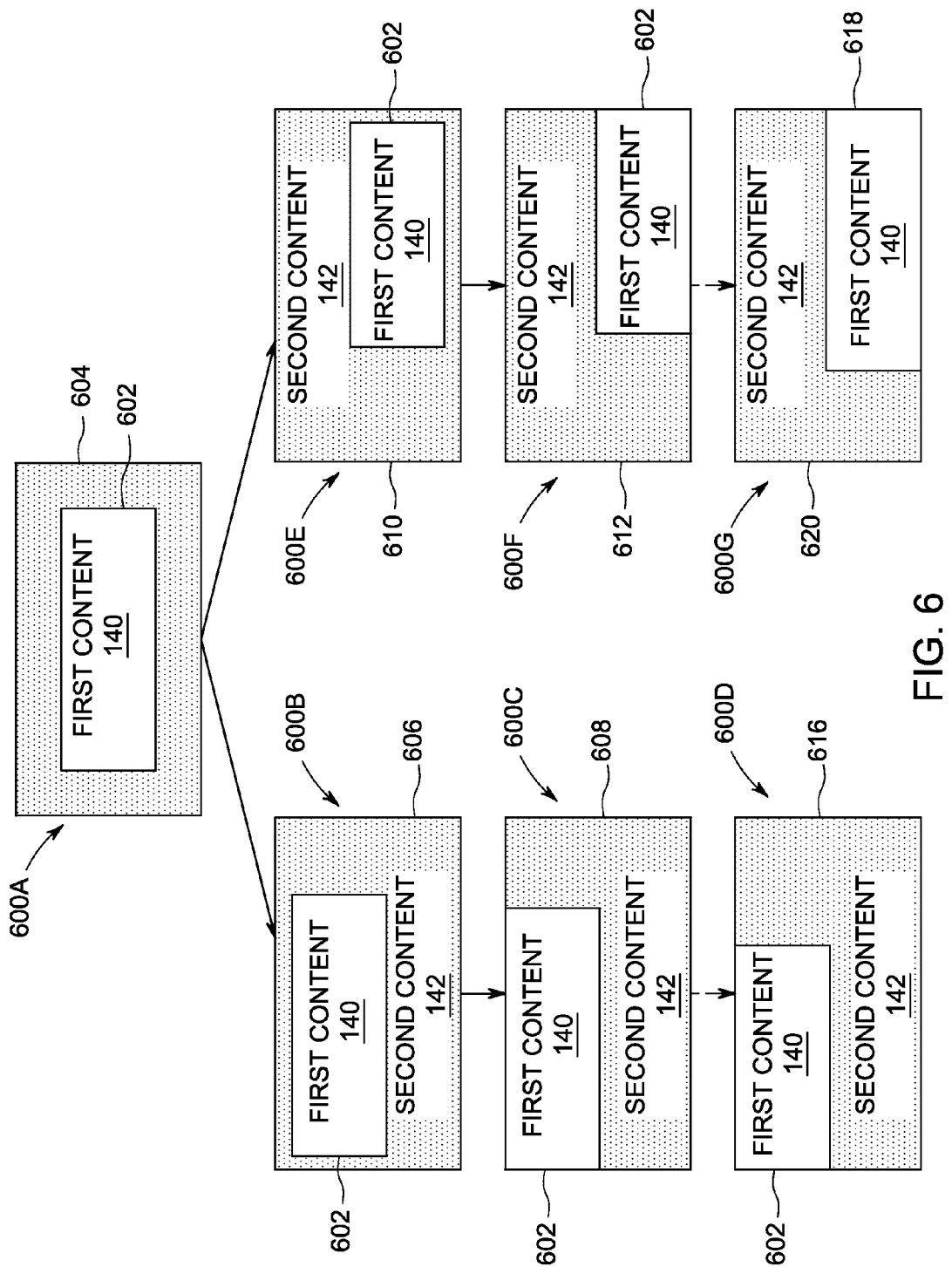
FIG. 6 illustrates formation of consolidated display region in an output video signal having unutilized regions on all sides of the first content region in accordance with an embodiment.

FIG. 6 illustrates formation of consolidated region in an output video signal having unutilized regions appearing on all sides of the first content region in accordance with an embodiment. FIG. 6 is described in conjunction with the block diagram of FIG. 1 and the flow diagrams of FIG. 2, FIG. 3a, FIG. 3b, FIG. 3c, and FIG. 3d.

FIG. 6 shows a display being generated 600a when the aspect ratio of the first content 140 differs from an aspect ratio of the display being generated 600a. The display 600a may also be generated when the size of the first content region differs from the size of the display being generated 600a. The display being generated 600a shows a first content region 602 having unutilized regions appearing on its all four sides (e.g., a windowbox format). The first content region 602 is associated with the first content 140. As shown, unutilized region 604 appears on the left side, the right side, above, and below the first content region 602. The signal-processing device 102 may modify the display being generated 600a according to various embodiments of the disclosure to form an output video signal. The output video signal may be stored in frame buffer in the signal-processing device 102 and/or rendered for display on the display screen 114. In an embodiment, the consolidator 128 consolidates the unutilized region 604 on all sides of the first content region 602 by, at least partially, moving the first content region 602 towards at least one of a left, a right, a top, or a bottom edge of the display being generated 600a.

FIG. 6 shows an output video signal 600b that includes the first content region 602 and a consolidated region 606. The output video signal 600b shows the first content region 602 moved towards the left edge and the top edge of the output video signal 600b. The consolidator 128 consolidates the unutilized region 604, and forms the consolidated region 606 on the left side and below the first content region 602. Due to movement of the unutilized region 604, some unutilized region 604 remains on the right side and above the first content region 602. In an embodiment, the signal manager 134 simultaneously associates the second content 142 with the consolidated region 606 and the first content 140 with the first content region 602. In another embodiment, the signal manager 134 simultaneously associates the second content 142 with the unutilized region 604 and the consolidated region 606, and the first content 140 with the first content region 602. The unutilized region 604 and the consolidated region 606 may be associated with similar or different second content 142.

In another embodiment, the consolidator 128 maximizes the consolidated region 606 by aligning the first content region 602 with the left edge and the top edge of the output video signal 600b.

FIG. 6 shows an output video signal 600c that includes the first content region 602 and a consolidated region 608. The output video signal 600c shows the first content region 602 aligned with the left edge and the top edge of the output video signal 600c. The consolidator 128 consolidates the unutilized region 604 and forms the consolidated region 608 on the right side and below the first content region 602. The signal manager 134 simultaneously associates the second content 142 with the consolidated region 608 and the first content 140 with the first content region 602. Further, signal manager 134 may change the size of the consolidated region 608 by scaling the first content region 602.

FIG. 6 shows an output video signal 600d that includes a scaled-down first content region 614. If the second content 142 is more important than the first content 140 and/or a larger consolidated region is required for the second content 142, the signal manager 134 reduces the size of the first content region 602. Thus, the signal manager 134 forms the scaled-down first content region 614 and an enlarged consolidated region 616. Hence, the size of the enlarged consolidated region 616 is more than the size of the consolidated region 608.

FIG. 6 shows an output video signal 600e that includes the first content region 402 and a consolidated region 610. The output video signal 600e shows the first content region 602 moved towards the right edge and the bottom edge of the output video signal 600e. The consolidator 128 consolidates the unutilized region 604 and forms the consolidated region 610 on the left side and above the first content region 602. Due to movement of the unutilized region 604, an unutilized region 604 remains on the right side and below the first content region 602. In an embodiment, the signal manager 134 simultaneously associates the second content 142 with the consolidated region 610 and the first content 140 with the first content region 602. In another embodiment, the signal manager 134 simultaneously associates the second content 142 with the unutilized region 604 and the consolidated region 610, and the first content 140 with the first content region 602. The unutilized region 604 and the consolidated region 610 may be associated with similar or different second content 142.

In another embodiment, the consolidator 128 maximizes the consolidated region 610 by aligning the first content region 602 with the right edge and the bottom edge of the output video signal 600d.

FIG. 6 shows an output video signal 600f that includes the first content region 602 and a consolidated region 612. The output video signal 600f shows the first content region 602 aligned with the right edge and the bottom edge of the output video signal 600f. The consolidator 128 consolidates the unutilized region 604 and forms a consolidated region 612 on the left side and above the first content region 602. The signal manager 134 simultaneously associates the second content 142 with the consolidated region 612 and the first content 140 with the first content region 602. Further, signal manager 134 may change the size of the consolidated region 612 by scaling the first content region 602.

FIG. 6 shows an output video signal 600g that includes a scaled-up first content region 618. If the first content 140 is more important than the second content 142 and/or a smaller consolidated display region is required for the second content 142, the signal manager 134 may increase the size of the first content region 602. Thus, the signal manager 134 forms the scaled-up first content region 618 and a reduced consolidated region 620. Hence, the size of the reduced consolidated region 620 is less than the size of the consolidated region 612. In an embodiment, the signal manager 134 increases size of the scaled-up first content region 618 to such an extent that the scaled-up first content region 618 covers the entire output video signal 600g. In such a case, no consolidated region will appear on the output video signal 600g.

Figure 7:
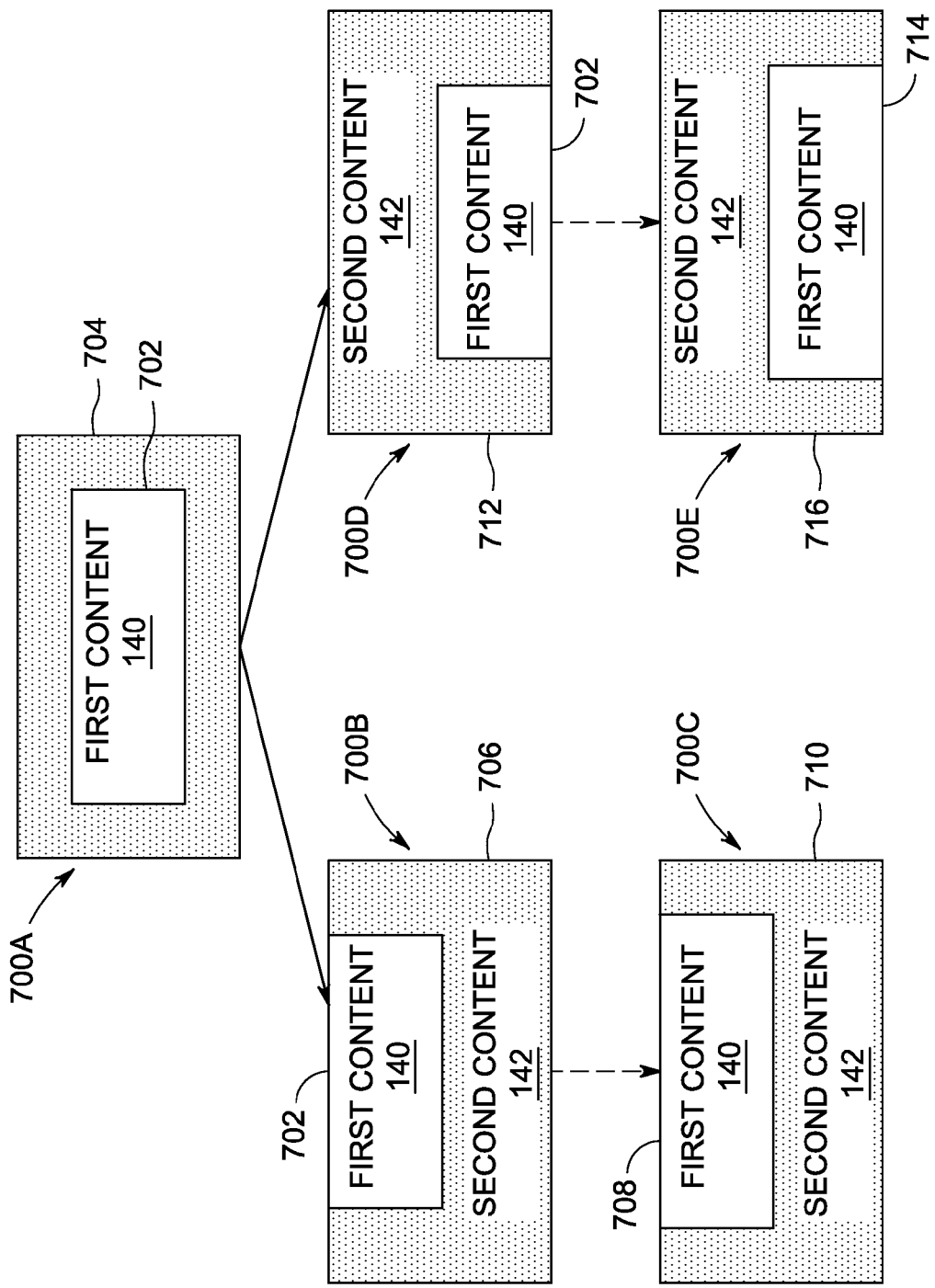
FIG. 7 illustrates formation of consolidated display region in an output video signal having unutilized regions appearing on all sides of the first content region in accordance with an alternative embodiment.

FIG. 7 illustrates formation of consolidated region in an output video signal having unutilized regions appearing on all sides of the first content region in accordance with an alternative embodiment. FIG. 7 is described in conjunction with the block diagram of FIG. 1 and the flow diagrams of FIG. 2, FIG. 3a, FIG. 3b, FIG. 3c, and FIG. 3d.

FIG. 7 shows a display being generated 700a when the aspect ratio of the first content 140 differs from an aspect ratio of the display being generated 700a. The display 700a may also be generated when the size of the first content region differs from the size of the display being generated 700a. The display being generated 700a shows a first content region 702 having unutilized regions appearing on its all four sides. The first content region 602 is associated with the first content 140. As shown, unutilized region 704 appears on the left side, the right side, above, and below the first content region 702. The signal-processing device 102 may modify the display being generated 700a according to various embodiments of the disclosure to form an output video signal. The output video signal may be stored in frame buffer in the signal-processing device 102 and/or rendered for display on the display screen 114. In an embodiment, the consolidator 128 consolidates the unutilized region 704 on all sides of the first content region 702 by, at least partially, moving the first content region 702 towards at least one of a left, a right, a top, or a bottom edge of the display being generated 700a.

FIG. 7 shows an output video signal 700b that includes the first content region 702 and a consolidated region 706. The output video signal 700b shows the first content region 702 moved towards the top edge of the output video signal 700b. The consolidator 128 consolidates the unutilized region 704 by moving the first content region 702 towards the top edge of the output video signal 700b. As a result, consolidator 128 forms the consolidated region 706 on the left and right sides, and below the first content region 702. The signal manager 134 simultaneously associates the second content 142 with the consolidated region 706 and the first content 140 with the first content region 702. Further, signal manager 134 may change the size of the consolidated region 706 by scaling the first content region 702.

FIG. 7 shows an output video signal 700c that includes a scaled-down first content region 708. If the second content 142 is more important than the first content 140 and/or a larger consolidated region is required for the second content 142, the signal manager 134 reduces the size of the first content region 702. Thus, the signal manager 134 forms the scaled-down first content region 708 and an enlarged consolidated region 710. Hence, the size of the enlarged consolidated region 710 is more than the size of the consolidated region 706.

FIG. 7 shows an output video signal 700d that includes the first content region 702 and a consolidated region 712. The output video signal 700d shows the first content region 702 moved towards the bottom edge of the output video signal 700d. The consolidator 128 consolidates the unutilized region 704 by moving the first content region 702 towards the bottom edge of the output video signal 700d. As a result, the consolidator 128 forms the consolidated region 712 on the left and right sides, and above the first content region 702. The signal manager 134 simultaneously associates the second content 142 with the consolidated region 712 and the first content 140 with the first content region 702. Further, the signal manager 134 may change the size of the consolidated region 712 by scaling the first content region 702.

FIG. 7 shows an output video signal 700e that includes a scaled-up first content region 714. If the second content 142 is more important than the first content 140 and/or a larger consolidated region is required for the second content 142, the signal manager 134 increases the size of the first content region 702. Thus, the signal manager 134 forms the scaled-up first content region 714 and a reduced consolidated region 716. Hence, the size of the reduced consolidated region 716 is more than the size of the consolidated region 712. In an embodiment, the signal manager 134 increases size of the scaled-up first content region 714 to such an extent that the scaled-up first content region 714 covers the entire output video signal 700e. In such a case, no consolidated region will appear on the output video signal 700e.

FIG. 8 illustrates an example of consolidating the plurality of unutilized regions by scaling down the size of the first content region in accordance with an embodiment. FIG. 8 is described in conjunction with the block diagram of FIG. 1 and the flow diagrams of FIG. 2, FIG. 3a, FIG. 3b, FIG. 3c, FIG. 3d, and FIG. 3e.

FIG. 8 shows a display being generated 800a when the aspect ratio of the first content 140 differs from an aspect ratio of the display being generated 800a. The display 800a may also be generated when the size of the first content region differs from the size of the display 800a being generated. The display being generated 800a shows a first content region 802 with more height than width (e.g., a pillarbox format). The first content region 802 is associated with the first content 140. As shown, unutilized regions 804*a* and 804*b* appear respectively on the left and right side of the first content region 802. The signal-processing device 102 may modify the display being generated 800*a* according to various embodiments of the disclosure to form an output video signal. The output video signal may be stored in frame buffer in the signal-processing device 102 and/or rendered for display on the display screen 114. In an embodiment, the consolidator 128 consolidates the unutilized regions 804*a* and 804*b* by scaling down the size of the first content region 802.

FIG. 8 shows an output video signal 800*b* that includes a scaled-down first content region 806 and a consolidated region 808. The signal manager 134 scales down the size of the first content region 802 to create new unutilized regions around the first content region 802. The consolidator 128 consolidates the new formed unutilized regions with the unutilized regions 804*a* and 804*b* to form the consolidated region 808. In an embodiment, the consolidator 128 moves the consolidated region 808 towards at least one edge of the output video signal 800*b* subsequent to scaling the size of the first content region 802.

FIG. 8 shows an output video signal 800*c* that includes the scaled-down first content region 806 and a consolidated region 810. The output video signal 800*c* shows the scaled-down first content region 806 aligned with left edge of the output video signal 800*c*. The consolidated region 810 is formed on the right side and bottom the scaled-down first content region 806.

FIG. 8 shows consolidating the plurality of unutilized regions by scaling down the size of the first content region for a pillarbox format. However, the disclosure is not limited to pillarbox format only. A person skilled in the art would appreciate that the plurality of unutilized regions in different display formats (such as letterbox format and windowbox format) can also be consolidating by scaling down the size of the first content region.

FIG. 8 shows that size of the first content region can be scaled in such a way that aspect ratio of the first content region remains unchanged on scaling. However, the disclosure is not limited to preserving the aspect ratio of the first content region. The aspect ratio of the first content region may change on scaling the size of the first content region without limiting the scope of the disclosure.

Embodiments of the disclosed methods and systems, as described in the ongoing description or any of its components, can occur in the form of a computer system. Typical examples of a computer system include, but are not limited to, a general-purpose computer, a programmed microprocessor, a micro-controller, a peripheral integrated circuit element, and other devices or arrangements of devices that are capable of implementing the steps that constitute the method of the present disclosure.

The computer system comprises a computer, an input device, a display unit and the Internet. The computer further comprises a microprocessor. The microprocessor connects to a communication bus. The computer also includes a memory. The memory may be Random Access Memory (RAM) or Read Only Memory (ROM). The computer system further comprises a storage device, which may be a hard-disk drive or a removable storage drive, such as a floppy-disk drive, optical-disk drive. The storage device may also be other similar means for loading computer programs or other instructions into the computer system. The computer system also includes a communication unit. The communication unit allows the computer to connect to other databases and the Internet through an Input/output (I/O) interface, allowing the transfer as well as reception of data from other databases. The communication unit may include a modem, an Ethernet card, or any other similar device, which enables the computer system to connect to databases and networks, such as LAN, MAN, WAN and the Internet. The computer system facilitates inputs from a customer through an input device, accessible to the system through an I/O interface.

The computer system executes a set of instructions that are stored in one or more storage elements, in order to process input data. The storage elements may also hold data or other information as desired. The storage element may be in the form of an information source or a physical memory element present in the processing machine.

The programmable or computer-readable instructions may include various commands that instruct the processing machine to perform specific tasks such as the steps that constitute the method of the present disclosure. The method and systems described can also be implemented using only software programming or using only hardware or by a varying combination of the two techniques. The disclosure is independent of the programming language used and the operating system in the computers. The instructions for the disclosure can be written in all programming languages including, but not limited to 'C', 'C++', 'Visual C++' and 'Visual Basic'. Further, the software may be in the form of a collection of separate programs, a program module with a larger program or a portion of a program module, as in the present disclosure. The software may also include modular programming in the form of object-oriented programming. The processing of input data by the processing machine may be in response to customer commands, results of previous processing or a request made by another processing machine. The disclosure can also be implemented in all operating systems and platforms including, but not limited to, 'Unix', 'DOS', 'Android', 'Symbian', 'Windows', 'iOS', and 'Linux'.

The programmable instructions can be stored and transmitted on a computer-readable medium. Data signals can transmit the programmable instructions across a carrier wave. Embodiments of the disclosure can occur in a computer program product comprising a computer-readable medium, with the product capable of implementing the above methods and systems, or the numerous possible variations thereof.

While various embodiments have been illustrated and described, it will be clear that the disclosure is not limited to these embodiments only. Numerous modifications, changes, variations, substitutions, and equivalents will be apparent to those skilled in the art without departing from the spirit and scope of the invention as described in the claims.

The invention claimed is:
1. An apparatus, comprising:
   a processor configured to:
      consolidate a plurality of unutilized regions of a display to constitute a consolidated region based on a determination of a difference between an aspect ratio of the display being generated and an aspect ratio of first content;
      generate an output video signal having the consolidated region and a first content region associated with the first content, and
      wherein a size of the consolidated region is determined based on one or more rules; and adjust contrast of second content associated with the consolidated region based on a respective parameter of the first content associated with the first content region.

2. The apparatus of claim 1, wherein the processor is further configured to determine the difference between the aspect ratio of the display being generated and the aspect ratio of the first content, and detect the plurality of unutilized regions based on the difference between at least one of the aspect ratio of the display being generated or the aspect ratio of the first content, or the size of the display being generated and the size of the first content.

3. The apparatus of claim 1, where the processor is further configured to consolidate the plurality of unutilized regions by at least one of (1) scaling down size of the first content region associated with the first content, (2) at least partially moving the first content region associated with the first content towards at least one edge of the output video signal, or (3) aligning the first content region with the at least one edge of the output video signal.

4. The apparatus of claim 1, wherein the processor is further configured to define the one or more rules, wherein the one or more rules are further associated with utilization of the consolidated region.

5. The apparatus of claim 1, wherein the processor is further configured to utilize the one or more rules to select the second content associated with the consolidated region.

6. The apparatus of claim 1, wherein the processor is further configured to scale size of the first content region based on the size of the consolidated region associated with the second content.

7. The apparatus of claim 1, wherein the processor is further configured to adjust at least one of a shape, a size, or an orientation of the second content based on the size of the consolidated region.

8. The apparatus of claim 1, wherein the processor is further configured to consolidate the plurality of unutilized regions based on an availability of the second content associated with the consolidated region.

9. The apparatus of claim 1, wherein the one or more rules are defined based on at least one of a first set of parameters associated with a user associated with the apparatus, a second set of parameters associated with a content provider, metadata associated with the first content, or the second content associated with the consolidated region.

10. A method, comprising:
    detecting a plurality of unutilized regions of the display based on a difference between an aspect ratio of the display being generated and an aspect ratio of first content;
    consolidating the plurality of unutilized regions based on the detection to constitute a consolidated region; and
    generating an output video signal having the consolidated region and a first content region associated with the first content, wherein a location of the consolidated region is determined based on one or more rules,
    wherein contrast of second content associated with the consolidated region is adjusted based on a respective parameter of the first content associated with the first content region.

11. The method of claim 10, wherein the detecting further comprises:
    determining that a size of the first content differs from a size of the display being generated; and
    detecting the plurality of unutilized regions based on a difference between the size of the display being generated and the size of the first content.

12. The method of claim 10, where the consolidated region is constituted based on at least one of scaling down size of at least one of the first content region associated with the first content or at least partially moving the first content region associated with the first content towards at least one edge of the output video signal.

13. The method of claim 10 further comprising aligning the first content region with at least one edge of the output video signal to maximize a size of the consolidated region.

14. The method of claim 10 further comprising defining the one or more rules, wherein the one or more rules are further associated with utilization of the consolidated region.

15. The method of claim 10 further comprising associating the second content with the consolidated region based on the one or more rules.

16. A non-transitory computer-readable medium having stored thereon, computer-executable instructions which when executed by a computer cause the computer to execute operations, the operations comprising:
    determining that an aspect ratio of first content differs from an aspect ratio of a display being generated; and
    consolidating a plurality of unutilized regions of the display based on the determination to generate an output video signal having a consolidated region and a first content region associated with the first content, wherein a location of the consolidated region is determined based on one or more rules,
    wherein contrast brightness of second content associated with the consolidated region is adjusted based on a respective parameter of the first content associated with the first content region.

17. The non-transitory computer-readable medium of claim 16, further comprising detecting the plurality of unutilized regions based on a difference between size of the display being generated and size of the first content.

18. The non-transitory computer-readable medium of claim 16, wherein the consolidated region is constituted based on at least one of scaling down size of the first content region associated with the first content or at least partially moving the first content region associated with the first content towards at least one edge of the output video signal.

19. The non-transitory computer-readable medium of claim 16, further comprising defining the one or more rules, wherein the one or more rules are further associated with utilization of the consolidated region.

* * * * *

UNITED STATES PATENT AND TRADEMARK OFFICE
CERTIFICATE OF CORRECTION

PATENT NO. : 9,756,282 B2  
APPLICATION NO. : 13/682493  
DATED : September 5, 2017  
INVENTOR(S) : Charles McCoy, Ling Jun Wong and True Xiong Page 1 of 1

It is certified that error appears in the above-identified patent and that said Letters Patent is hereby corrected as shown below:

On the Title Page

Under Item (73), "Assignee: Sony Corporation, Tokyo (JP)" should be -- Assignee: Sony Corporation, Tokyo (JP); Sony Network Entertainment International LLC, Los Angeles, CA --

Signed and Sealed this  
Twenty-first Day of August, 2018

Andrei Iancu  
*Director of the United States Patent and Trademark Office*